(12) United States Patent
Dede et al.

(10) Patent No.: US 12,187,269 B2
(45) Date of Patent: Jan. 7, 2025

(54) OPTICAL SENSE-COMPUTE SOLUTION FOR REAL-TIME NAVIGATION INVOLVING MULTIPLE VEHICLES

(71) Applicant: TOYOTA MOTOR ENGINEERING & MANUFACTURING NORTH AMERICA, INC., Plano, TX (US)

(72) Inventors: Ercan M. Dede, Ann Arbor, MI (US); Paul D. Schmalenberg, Ann Arbor, MI (US); Sean P. Rodrigues, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 953 days.

(21) Appl. No.: 17/039,914

(22) Filed: Sep. 30, 2020

(65) Prior Publication Data

US 2022/0097690 A1 Mar. 31, 2022

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 30/143* (2013.01);
(Continued)

(58) Field of Classification Search
CPC ........ G06N 3/067; G06N 3/0675; G06N 3/08; G06N 3/044; G08G 1/167; G08G 1/166;
(Continued)

(56) References Cited

U.S. PATENT DOCUMENTS 5,095,459 A * 3/1992 Ohta ............... G06V 10/88
708/801
5,210,798 A 5/1993 Ekchian
(Continued)

FOREIGN PATENT DOCUMENTS

JP 2019514135 A * 5/2019
WO WO-2023126140 A1 * 7/2023

OTHER PUBLICATIONS

Model predictive path tracking control for automated road vehicles: A review, Annual Reviews in Control, vol. 55,2023 (Year: 2023).*
(Continued)

*Primary Examiner* — Angelina M Shudy
(74) *Attorney, Agent, or Firm* — SHEPPARD, MULLIN, RICHTER & HAMPTON LLP; Daniel N. Yannuzzi

(57) ABSTRACT

A real-time machine perception system and vehicles with real-time perception systems can be adapted for navigation in conflict zone environments and include an optical sensor and an optical processing component coupled to the optical sensor. The optical processing component can be configured to solve a non-linear control problem comprising solving a multi-vehicle merging or multi-vehicle synchronization problem. The optical processing component can perform optical processing on a signal from the optical sensor according to a deep learning algorithm having weights determined by solving the non-linear control problem.

21 Claims, 6 Drawing Sheets

(51) Int. Cl.
  *B60W 30/14* (2006.01)
  *B60W 30/18* (2012.01)
  *B60W 60/00* (2020.01)
  *G01C 21/34* (2006.01)
  *G06N 3/08* (2023.01)
  *G08G 1/00* (2006.01)
  *G08G 1/16* (2006.01)

(52) U.S. Cl.
  CPC .. *B60W 30/18163* (2013.01); *B60W 60/0027* (2020.02); *G01C 21/3461* (2013.01); *G06N 3/08* (2013.01); *G08G 1/166* (2013.01); *G08G 1/20* (2013.01); *B60W 2420/403* (2013.01); *B60W 2420/408* (2024.01); *B60W 2520/00* (2013.01); *B60W 2554/4041* (2020.02); *B60W 2556/65* (2020.02); *G08G 1/22* (2013.01)

(58) Field of Classification Search
  CPC .......... G08G 1/20; G08G 1/22; B60W 30/09; B60W 30/0956; B60W 30/143; B60W 30/18163; B60W 60/0027; B60W 2420/42; B60W 2420/52; B60W 2520/00; B60W 2554/4041; B60W 2556/65; B60W 2754/50; B60W 2420/403; B60W 2420/408; G01C 21/3461; G01C 21/3602; G05D 1/00
  See application file for complete search history.

(56) References Cited

U.S. PATENT DOCUMENTS

| | | | |
|---|---|---|---|
| 5,479,571 A | 12/1995 | Parlos | |
| 5,483,446 A * | 1/1996 | Momose | B62D 7/159 701/1 |
| 6,847,894 B1 * | 1/2005 | Hasegawa | B60T 7/22 382/104 |
| 6,882,992 B1 | 4/2005 | Werbos | |
| 9,760,806 B1 * | 9/2017 | Ning | G06V 20/56 |
| 10,268,232 B2 * | 4/2019 | Harris | G06E 3/003 |
| 10,484,401 B2 * | 11/2019 | Jung | G06N 3/047 |
| 10,671,076 B1 * | 6/2020 | Kobilarov | G08G 1/166 |
| 10,836,395 B2 * | 11/2020 | Liu | G05D 1/0221 |
| 11,037,968 B2 * | 6/2021 | Ion | G06V 10/25 |
| 11,080,602 B1 * | 8/2021 | Oroojlooyjadid | G06N 3/045 |
| 11,279,343 B2 * | 3/2022 | Ihlenburg | B60W 50/14 |
| 11,320,588 B1 * | 5/2022 | Mazed | G16H 10/40 |
| 11,398,871 B2 * | 7/2022 | Bunandar | G06N 3/084 |
| 11,494,685 B2 * | 11/2022 | Kuwajima | G06N 20/00 |
| 11,577,722 B1 * | 2/2023 | Packer | G06V 10/82 |
| 11,623,664 B1 * | 4/2023 | Ganguli | B60W 30/18163 701/26 |
| 11,656,337 B2 * | 5/2023 | Rodrigues | G01S 7/4816 367/118 |
| 11,691,650 B2 * | 7/2023 | Li | B60W 60/00272 706/15 |
| 11,699,062 B2 * | 7/2023 | Isele | G06F 18/214 701/23 |
| 12,049,230 B2 * | 7/2024 | Nagaraja | G06N 3/044 |
| 12,073,315 B2 * | 8/2024 | Shen | G06F 17/16 |
| 2003/0050742 A1 * | 3/2003 | Sakamoto | G07C 5/008 701/1 |
| 2003/0191568 A1 * | 10/2003 | Breed | B60W 40/06 701/469 |
| 2004/0107030 A1 * | 6/2004 | Nishira | B60W 50/08 348/148 |
| 2013/0052614 A1 * | 2/2013 | Mollicone | G09B 19/167 434/65 |
| 2013/0054106 A1 * | 2/2013 | Schmudderich | G01S 13/931 701/1 |
| 2015/0175161 A1 * | 6/2015 | Breed | B60W 30/08 348/148 |
| 2016/0362118 A1 * | 12/2016 | Mollicone | G05D 1/0276 |
| 2017/0124476 A1 * | 5/2017 | Levinson | G06V 20/58 |
| 2017/0210414 A1 * | 7/2017 | Sato | B60W 10/20 |
| 2017/0351293 A1 * | 12/2017 | Carolan | G02F 1/3526 |
| 2018/0012082 A1 * | 1/2018 | Satazoda | G06V 10/763 |
| 2018/0032082 A1 * | 2/2018 | Shalev-Shwartz | G01C 21/3453 |
| 2018/0067195 A1 * | 3/2018 | Slobodyanyuk | G01S 7/4815 |
| 2018/0148051 A1 * | 5/2018 | Lujan | B60W 30/18154 |
| 2018/0173240 A1 * | 6/2018 | Fang | G05D 1/0212 |
| 2018/0275657 A1 * | 9/2018 | You | G05B 23/0294 |
| 2019/0025841 A1 * | 1/2019 | Haynes | B60W 30/00 |
| 2019/0049967 A1 * | 2/2019 | Lim | G05D 1/0088 |
| 2019/0113917 A1 * | 4/2019 | Buch | G06N 3/00 |
| 2019/0152490 A1 * | 5/2019 | Lan | G06V 20/58 |
| 2019/0220737 A1 * | 7/2019 | Yao | G06N 3/04 |
| 2019/0220744 A1 * | 7/2019 | Yao | G05D 1/0088 |
| 2019/0221121 A1 * | 7/2019 | Guo | H04W 4/46 |
| 2019/0385057 A1 * | 12/2019 | Litichever | H04L 63/14 |
| 2020/0065711 A1 * | 2/2020 | Clement | B60W 40/02 |
| 2020/0084427 A1 * | 3/2020 | Sun | G06N 3/045 |
| 2020/0139973 A1 * | 5/2020 | Palanisamy | G06N 3/084 |
| 2020/0142421 A1 * | 5/2020 | Palanisamy | G06N 3/044 |
| 2020/0148201 A1 * | 5/2020 | King | G06N 20/00 |
| 2020/0160172 A1 * | 5/2020 | Fang | G06N 3/08 |
| 2020/0189597 A1 * | 6/2020 | Veronese | B60W 60/0011 |
| 2020/0311532 A1 * | 10/2020 | Jalali | G06V 20/69 |
| 2020/0321374 A1 * | 10/2020 | Ion | H01L 27/14609 |
| 2020/0324794 A1 * | 10/2020 | Ma | B60W 60/00272 |
| 2021/0012184 A1 * | 1/2021 | Rodrigues | G01S 7/4818 |
| 2021/0023990 A1 * | 1/2021 | Lynar | B60Q 9/00 |
| 2021/0078603 A1 * | 3/2021 | Nakhaei Sarvedani | B60W 30/18163 |
| 2021/0097148 A1 * | 4/2021 | Bagschik | G06F 30/15 |
| 2021/0114604 A1 * | 4/2021 | Nagaraja | G06N 3/08 |
| 2021/0142170 A1 * | 5/2021 | Ozcan | G06N 3/04 |
| 2021/0146963 A1 * | 5/2021 | Li | G06N 20/00 |
| 2021/0182596 A1 * | 6/2021 | Adams | G06V 20/588 |
| 2021/0320678 A1 * | 10/2021 | Luo | G06N 3/08 |
| 2021/0323555 A1 * | 10/2021 | Sholingar | B60W 10/10 |
| 2021/0341920 A1 * | 11/2021 | Singh | G06N 3/088 |
| 2021/0349324 A1 * | 11/2021 | Vuong | G02B 3/0006 |
| 2021/0370941 A1 * | 12/2021 | Zhu | B60W 40/09 |
| 2021/0406667 A1 * | 12/2021 | Timofejevs | G06F 30/39 |
| 2022/0066460 A1 * | 3/2022 | Ivanovic | G06F 18/214 |
| 2022/0076570 A1 * | 3/2022 | Ma | G08G 1/0145 |
| 2022/0129320 A1 * | 4/2022 | Mohapatra | G06F 15/825 |
| 2022/0156576 A1 * | 5/2022 | Rasouli | G06N 3/045 |
| 2022/0198688 A1 * | 6/2022 | Xiao | G05D 1/0274 |
| 2022/0204030 A1 * | 6/2022 | Nishimura | G06V 20/58 |
| 2022/0222983 A1 * | 7/2022 | Vejalla | G06F 18/2113 |
| 2022/0392089 A1 * | 12/2022 | Guizilini | G06N 3/0455 |
| 2023/0020503 A1 * | 1/2023 | Rahman | G05D 1/0221 |
| 2023/0081921 A1 * | 3/2023 | Hawasly | G05D 1/0217 |
| 2023/0089978 A1 * | 3/2023 | Pulver | G05D 1/0221 |
| 2023/0093042 A1 * | 3/2023 | Cot | B60W 30/146 |
| 2023/0138137 A1 * | 5/2023 | Ogawa | G06V 10/62 701/26 |
| 2023/0419113 A1 * | 12/2023 | Genc | G06F 16/904 |
| 2024/0193410 A1 * | 6/2024 | Shen | G06N 3/044 |

OTHER PUBLICATIONS

A survey of approaches for implementing optical neural networks Xu et al. 2021 (Year: 2021).*
Optical Implementation of Two Dimensional Bipolar Hopfield Model Neural Network Ramachandran et al. 2000 (Year: 2000).*
De Lima et al., Machine Learning With Neuromorphic Photonics, Journal of Lightwave Technology, vol. 37, No. 5, Mar. 1, 2019; pp. 1515-1534.
Shastri et al., Principles of Neuromorphic Photonics, Department of Electrical Engineering, Princeton University, Princeton, NJ 08544, USA, Jan. 3, 2018; pp. 1-28.
De Lima et al., Progress in neuromorphic photonics, De Gruyter, Nanophotonics 2017; 6(3): pp. 577-599.
Mahbub et al., A Decentralized Time- and Energy-Optimal Control Framework for Connected Automated Vehicles: From Simulation to

(56) References Cited

OTHER PUBLICATIONS

Field Test, https://arxiv.org/pdf/1911.01380.pdf; arXiv:1911.01380v2 [math.OC] Jan. 24, 2020, pp. 1-11.

* cited by examiner

OPTICAL SENSE-COMPUTE SOLUTION FOR REAL-TIME NAVIGATION INVOLVING MULTIPLE VEHICLES

TECHNICAL FIELD

The present disclosure relates generally to real-time navigation through vehicle conflict zones using optical machine perception.

BRIEF SUMMARY OF THE DISCLOSURE

Conflict zones can overload advanced driver-assistance systems with stimuli, and can create dangerous situations if systems do not have fast response times. Existing vehicles with advanced driver-assistance systems may not be able to navigate multi-vehicle conflict zones without human driver intervention. Methods and systems described herein allow for vehicle merging into multi-vehicle conflict zone(s) without relying on driver assistance. Further, methods and systems described herein allow for navigation through multi-vehicle conflict zones without relying on connective information, coordination among vehicles, and/or heavily trained machine recognition systems (all of which can be slow, impracticable, data intensive, and/or unreliable).

Embodiments may provide a real-time machine perception system for vehicle actuation in a multi-vehicle environment.

Real-time machine perception system for vehicle actuation in a multi-vehicle environment can include an optical sensor for receiving a reflected portion of light from one or more objects within a field of view of the optical sensor. Optical sensor can generate an optical signal based on the reflected portion of light. The reflected portion of light can at least partially be reflected off an obstacle in the field of view.

Real-time machine perception system can further include an optical processing component coupled to the optical sensor. The optical processing component include an optical neural network (ONN). The optical processing component can be configured to solve a non-linear control problem. The non-linear control problem can involve multi-vehicle merging or synchronization. The optical processing component can process using a deep learning algorithm. Weights of the deep learning algorithm can be determined by solving the non-linear control problem. The weights can be determined by training and updated based on outcomes for the mobile vehicle moving into the conflict zone. The optical processing component can apply the deep learning algorithm to the optical signal.

Real-time machine perception system can include an electronic actuation signal generation component. The electronic actuation signal generation component can be coupled to the ONN. The electronic actuation signal generation component can be configured to generate an electronic actuation signal. The electronic actuation signal can be configured to control an actuation system of a first vehicle.

The electronic actuation signal can correspond to an actuation of the first vehicle. The actuation can be for adjusting a relative velocity between the first vehicle and an obstacle. The actuation can be for collision avoidance between the first vehicle and the obstacle.

The obstacle can be a second vehicle other than the first vehicle.

Solving the non-linear control problem can include solving a multi-vehicle merging or multi-vehicle synchronization problem. Solving the non-linear control problem can include solving a multi-vehicle merging or multi-vehicle synchronization problem in a conflict zone or conflict scenario. The conflict zone or conflict scenario can include a speed reduction zone. The conflict zone or conflict scenario can include a roundabout. The conflict zone or conflict scenario can include a merging on-ramp.

The optical neural network can include a subset of optical neuron components dedicated to a classification task. The subset of optical neuron components can be dedicated to classifying the likelihood of successful merging, including safe and/or comfortable merging. The subset of optical neuron components can perform machine vision image recognition. The subset of optical neuron components can classify the likelihood of successful merging, including safe and/or comfortable merging, by performing machine vision image recognition. One or more Weights for the deep learning algorithm can be updated based on outcomes for first-vehicle merging events, such as a successful merging outcome, or an unsuccessful merging outcome.

The non-linear control problem can include a model predictive control algorithm based on the vehicle state for the first vehicle and a state of the second vehicle. The ONN can implement a recurrent neural network. The recurrent neural network can solve a quadratic programming problem by using the optical components. The recurrent neural network can be implemented by mapping the model predictive control algorithm to a quadratic programming problem. The recurrent neural network can be implemented by solving the quadratic programming problem with the recurrent neural network.

The real-time machine perception system can require no cloud, first-vehicle to second vehicle, or network connectivity to generate the electronic actuation signal.

The electronic actuation signal can correspond to a first vehicle direction or trajectory. The electronic actuation signal an correspond to a velocity rate of change for the first vehicle.

The sensor signal an include an optical signal. The optical signal can correspond to at least one of: a first vehicle velocity, a first vehicle trajectory, a first vehicle steering angle, an obstacle position, an obstacle velocity, or an obstacle trajectory.

Embodiments may include a vehicle having real-time machine perception system for vehicle actuation in a multi-vehicle environment.

Embodiments may include a mobile vehicle for navigating in a multi-vehicle environment. The mobile vehicle can include a light detection and ranging (LiDAR) sensor mounted on the vehicle. The LiDAR sensor can be configured to generate an optical signal. The optical signal generated by the LiDAR sensor can be based on a perceive light from a LiDAR sensor field-of-view.

The mobile vehicle can include an optical neural network (ONN). The ONN can include optical processing components. The ONN can be coupled to the LiDAR sensor. The ONN can be configured to perform optical processing on the optical signal. Optical processing can be performed according to a deep learning algorithm. One or more weights for the deep learning algorithm can be determined by solving a non-linear problem. The non-linear problem can be associated with the mobile vehicle moving into a conflict zone.

The mobile vehicle can include an automated vehicle actuation component. The automated vehicle actuation component can be configured to control an actuator of the mobile vehicle. The automated vehicle actuation component can be coupled to the ONN. The automated vehicle actuation component can be configured to generate an electronic actuation signal corresponding to a motion produced by the actuator. The motion produced by the actuator can be for actuation of the mobile vehicle into the conflict zone. The motion produced by the actuator can be for actuation of the mobile vehicle into the conflict zone while avoiding collisions. The motion produced by the actuator can be for actuation of the mobile vehicle into the conflict zone while performing safe and/or comfortable merging. The conflict zone can include at least one of a speed reduction zone, a roundabout, or a merging on-ramp.

The ONN can be configured to detect that the mobile vehicle is approaching the conflict zone. The weights of the ONN can be determined by solving a control problem. The control problem can be:

$$\min_{u_i} \frac{1}{2} \int_{t_i^{o,z}}^{t_i^{m,z}} u_i^2(t)dt,$$

$\forall i \in \mathcal{N}_z(t)$. $\mathcal{N}_z(t)$ can correspond to a queue of vehicles detected to be approaching the conflict zone. The queue of vehicles can be inclusive of the mobile vehicle. i can denote a vehicle of the multi-vehicle environment, such as the mobile vehicle. z can denote a conflict scenario. z can denote a conflict scenario selected from the speed reduction zone, roundabout, or merging on-ramp. $u_i(t)$ can denote a control input for the actuator of the vehicle. $t_i^{o,z}$ can denote the time when vehicle i enters a control zone prior to the conflict zone. $t_i^{m,z}$ can denote the time the vehicle enters the conflict zone. The control problem can hold for the duration of mobile vehicle navigating the conflict zone. The control problem can be subject to at least one constraint, including for given $t_i^{o,z}$, $t_i^{m,z}$. The at least one constraint can be selected from a group consisting of: a vehicle dynamics constraint, a rear end safety constraint, and a lateral collision constraint.

The light perceived at the LiDAR sensor can include light reflected from two other vehicles other than the mobile vehicle.

The electronic actuation signal can correspond to a velocity rate of change for the mobile vehicle. The electronic actuation signal can correspond to a steering angle of the mobile vehicle. The electronic actuation signal can correspond to a heading of the mobile vehicle. The electronic actual signal can be such that the mobile vehicle respects a trajectory of one other vehicle, such as one of the two other vehicles, while the mobile vehicle moves into or traverses the conflict zone.

The mobile vehicle may not require vehicle-to-vehicle, vehicle-to-infrastructure, and/or vehicle-to-network connectivity. The mobile vehicle may not require vehicle-to-vehicle, vehicle-to-infrastructure, and/or vehicle-to-network connectivity for actuation of the first vehicle into the conflict zone while avoiding collisions.

The optical sensor can be configured to detect the approach into the conflict zone. When the approach into the conflict zone is detected, the ONN can receive a command to solve a non-linear problem. The non-linear problem or the command can be associated with the mobile vehicle moving into the conflict zone. One or more weights of the deep learning algorithm weights can be determined by solving the non-linear control problem.

The non-linear control problem can be a model predictive control problem. The model predictive control problem can be based on a vehicle state for the mobile vehicle. The model predictive control problem can be based on and a vehicle state of one other vehicle within the conflict zone. The model predictive control problem can model the mobile vehicle's approach into the conflict zone in view of a determined trajectory of the one other vehicle.

The electronic actuation signal can correspond to a least one of a velocity rate of change, and a steering angle, or heading for the mobile vehicle. The electronic actuation signal can correspond to a least one of a velocity rate of change, and a steering angle, or heading for the mobile vehicle such that the mobile vehicle follows the trajectory into the conflict zone. The trajectory into the conflict zone can be such that a trajectory of the other vehicle is respected, or that a collision is avoided.

The ONN can implement a recurrent ONN for solving quadratic programming problem. The quadratic programming problem can be solved by using the optical components. The recurrent ONN can be implemented by mapping the model predictive control problem to a quadratic programming problem. The recurrent ONN can be implemented by solving the quadratic programming problem.

A first population of neurons in the ONN can be dedicated to predicting the acceleration and/or trajectory of the mobile vehicle. A second population of neurons in the ONN can be dedicated to predicting if the trajectory of the other vehicle within the conflict zone will be violated by the mobile vehicle. Weights controlling the first population of can be configured by a first weight matrix. The first weight matrix can be adjusted based on responses to changes in acceleration and/or heading of the mobile vehicle. A first bias vector can control the bias of the first population of neurons. The first bias vector can correspond to the relative position between the mobile vehicle and the other vehicle. Weights controlling the second population of neurons can be configured by a second weight matrix. The second weight matrix can correspond to constraints on the mobile vehicle's motion based on respecting the other vehicle's trajectory. The other vehicle's trajectory can be respected within the conflict zone. The first population of neurons can be inhibited based on activation of the second population of neurons.

The conflict zone can include a merging on-ramp. Solving the non-linear problem can include solving a multi-vehicle merging problem by a model predictive control algorithm based on an acceleration state and a trajectory state for the mobile vehicle, and an acceleration state and trajectory state of one other vehicle within the conflict zone.

The weights can be determined by training and updated based on outcomes for the mobile vehicle moving into the conflict zone.

The electronic actuation signal can correspond to a velocity rate of change and/or a steering angle for the mobile vehicle. The electronic actuation signal can correspond to a velocity rate of change and/or a steering angle for the mobile vehicle such that the mobile vehicle merges into the merging on-ramp zone. The electronic actuation signal can be such that mobile vehicle merges into the merging on-ramp zone while not colliding with the other vehicle. The electronic actuation signal can be such that mobile vehicle merges into the merging on-ramp zone while minimizing stop-and-go driving.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
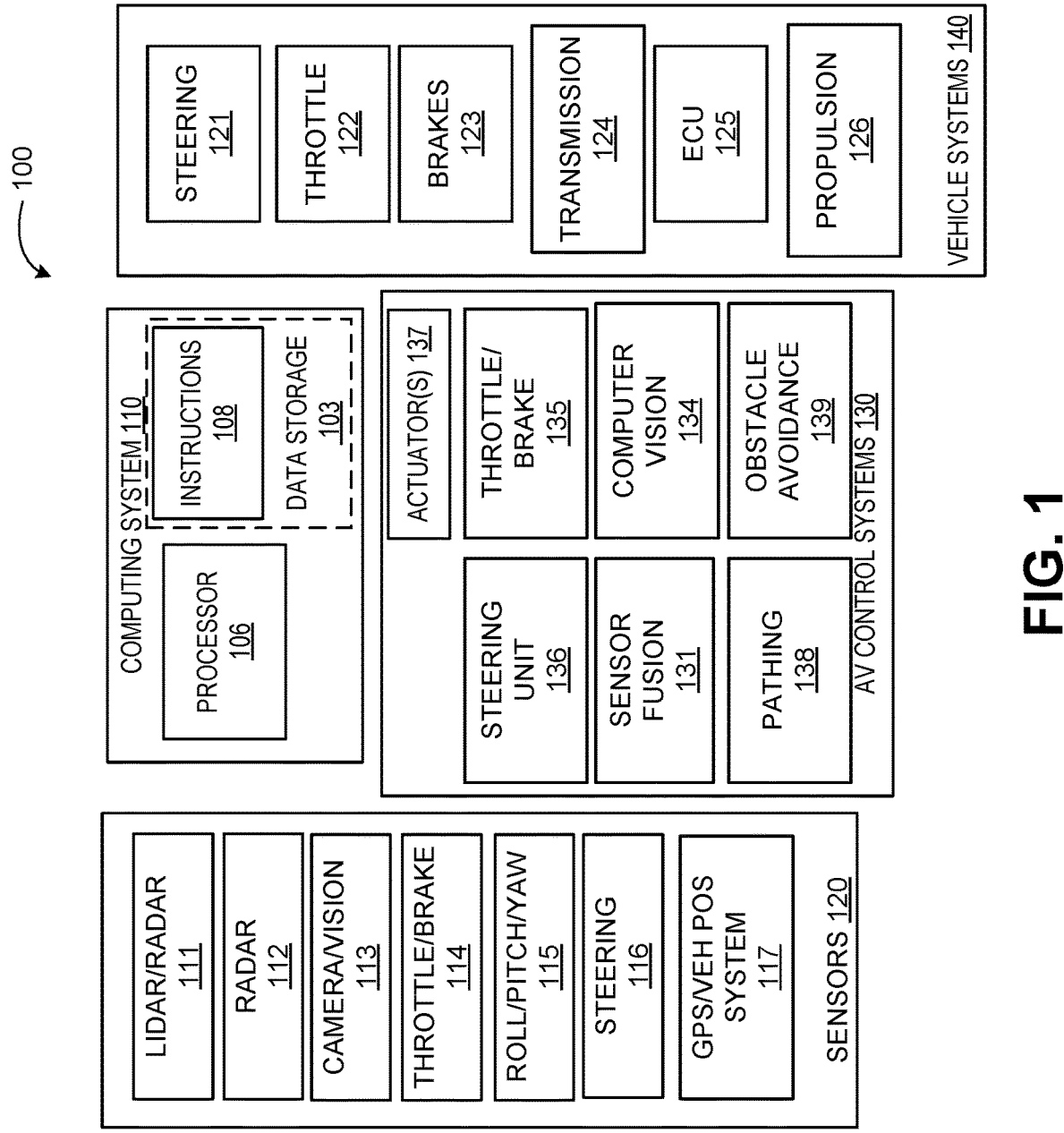
FIG. 1 illustrates an example autonomous or semi-autonomous vehicle with which embodiments of the disclosed technology may be implemented.

The figures are not exhaustive and do not limit the present disclosure to the precise form disclosed.

DETAILED DESCRIPTION

Navigating "conflict zones," e.g., areas of roadway where there is potential for vehicles to collide, is especially important for vehicles to navigate accurately and safely. This is especially true when the conflict zone has the potential for multiple vehicles to navigate the conflict zone at or around the same time. Some non-limiting examples of conflict zones can include areas where lanes, such as traffic lanes, on-ramps, pedestrian lanes, and/or bicycle lanes end, and/or terminate and/or merge into another roadway that can already be occupied by vehicles. Vehicles and/or obstacles in those ending and/or merging lanes can be forced to merge into a roadway. Thus, a conflict zone can be a physical area navigated by vehicles, and/or pedestrians. A conflict zone can be an area of heightened risk for rear-end and/or lateral collision. A conflict zone can include an area of high spatial and/or temporal density of vehicles, pedestrians, and other obstacles and/or traffic. A conflict zone can include areas with required "stop-and-go" driving, such as off-ramps, on-ramps, speed reduction zones, and/or general traffic. In or near such conflict zone, a plurality of vehicles may be involved, i.e., a multi-vehicle conflict zone. For example, conflict zones can be zones requiring one or more, two or more, three or more, etc. vehicles changing lanes and/or crossing the same intersection in certain area and/or time. Vehicle responses can be, for example, counter responses to the movements of other vehicles. A conflict zone can include an intersection (such as a four way, five way, six way, eight way, etc. intersection). These example conflict zones are merely examples and not meant to limit the disclosure to such conflict scenarios. In some embodiments, a conflict zone can be at least a portion of a setting of a conflict scenario. For example, a conflict scenario can include the conflict zone, but also vehicles and/or other obstacles navigating into or through that conflict zone. For example, a conflict scenario can include one or more, two or more, three or more, vehicles in single lanes, and/or in adjacent lanes, where one lane merges into another.

In or near such conflict zones, vehicle response to other vehicle movements and/or to obstacles can be erratic and/or unpredictable. Prior systems appear to solve this unpredictability by requiring connected vehicles to communicate with each other. Further conventional vehicle systems can rely on slower GPU/CPU-based systems, which can be inadequate for handling safe traversal of such conflict zones. Worse yet, some automated vehicle systems/advanced driver assistance systems (ADAS) may need to rely on manual, driver-intervention to safely navigate such conflict zones.

In accordance with various embodiments, an all-optical vehicle sensor-computer architecture that uses model predictive control (MPC) coupled with an optical processing component such as an optical neural network (ONN) can be used for trajectory planning and/or obstacle avoidance for a vehicle traversing a conflict zone. In accordance with various embodiments, the optical processing component or another processing component can be configured to solve a control problem (e.g. non-linear control problem) which can include solving a multi-vehicle merging or multi-vehicle synchronization problem. In accordance with various embodiments, the optical processing component can perform optical processing on an optical sensing signal according to a deep learning algorithm (e.g. MPC problem as mapped to a quadratic problem and solved by a continuous time recurrent neural network (CT-RNN)). In accordance with various embodiments weights, and/or gains for the deep learning algorithm can be adjusted and/or determined based on solving the non-linear control problem.

Vehicle Systems

FIG. 1 illustrates an example autonomous or semi-autonomous vehicle with which embodiments of the disclosed technology may be implemented. In this example, vehicle 100 includes a computing system 110, sensors 120, AV control systems, 130 and vehicle systems 140. "Sensor" means any device, component, and/or system that can detect, and/or sense something. The one or more sensors can be configured to detect, and/or sense in real-time. As used herein, the term "real-time" means a level of processing responsiveness that a user or vehicle senses as sufficiently immediate for a particular process or determination to be made, or that enables the processor to keep up with some external process. Either of the computing system 110, sensors 120, AV control systems 130, and/or vehicle systems 130 can be part of an ADAS. ADAS can provide navigation control signals (e.g. control signals to actuate the vehicle and/or operate one or more vehicle systems 140 as shown in FIG. 1) for the vehicle to navigate a variety of situations. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include a light detection and ranging (LiDAR) sensor 111, radar 112, and/or other sensor like distance measurement sensors, image sensors 113, throttle and brake sensors 114, 3D accelerometers 115, steering sensors 116, and/or a GPS or other vehicle positioning system 117. One or more of the sensors 120 may gather data and send that data to the vehicle ECU or other processing unit. Sensors 120 (and other vehicle components) may be duplicated for redundancy.

Distance measuring sensors such as a LiDAR sensor 111, radar 112, IR sensors and other like sensors can be used to gather data to measure distances and closing rates to various external objects such as other vehicles, traffic signs, pedestrians, light poles and other objects. Image sensors 111 can include one or more cameras or other image sensors to capture images of the environment around the vehicle as well as internal to the vehicle. Information from image sensors 113 (e.g. camera) can be used to determine information about the environment surrounding the vehicle 100 including, for example, information regarding other objects surrounding the vehicle 100. For example, image sensors 113 may be able to recognize landmarks or other features (including, e.g., street signs, traffic lights, etc.), slope of the road, lines on the road, curbs, objects and/or obstacles to be avoided (e.g., other vehicles, pedestrians, bicyclists, etc.) and other landmarks or features. Information from image sensors 113 can be used in conjunction with other information such as map data or information from positioning system 117 to determine, refine or verify vehicle location.

Throttle and brake sensors 114 can be used to gather data regarding throttle and brake application by a human or autonomous operator. Accelerometers 115 may include a 3D accelerometer to measure roll, pitch and yaw of the vehicle. Accelerometers 115 may include any combination of accelerometers and gyroscopes for the vehicle or any of a number of systems or subsystems within the vehicle to sense position and orientation changes based on inertia.

Steering sensors 116 (e.g., such as a steering angle sensor) can be included to gather data regarding steering input for the vehicle by a human or autonomous operator. A steering sensor may include a position encoder to monitor the angle of the steering input in degrees. Analog sensors may collect voltage differences that can be used to determine information about the angle and turn direction, while digital sensors may use an LED or other light source to detect the angle of the steering input. A steering sensor may also provide information on how rapidly the steering wheel is being turned. A steering wheel being turned quickly is generally normal during low-vehicle-speed operation and generally unusual at highway speeds. If the driver is turning the wheel at a fast rate while driving at highway speeds the vehicle computing system may interpret that as an indication that the vehicle is out of control. Steering sensor 116 may also include a steering torque sensor to detect an amount of force the driver is applying to the steering wheel.

Vehicle positioning system 117 (e.g., GPS or other positioning system) can be used to gather position information about a current location of the vehicle as well as other positioning or navigation information.

Although not illustrated, other sensors 120 may be provided as well. Various sensors 120 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 can include, autonomous driving module (not shown), steering unit 136, throttle and brake control unit 135, sensor fusion module 131, computer vision module 134, pathing module 138, obstacle avoidance module 139, and actuator(s) 137. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g., disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

Pathing module 138 may be included to compute a desired path for vehicle 100 based on input from various other sensors and systems. For example, pathing module 138 can use information from positioning system 117, sensor fusion module 131, computer vision module 134, obstacle avoidance module 139 (described below) and other systems (e.g. AV control systems 130, sensors 120, and/or vehicle systems 140) to determine a safe path to navigate the vehicle along a segment of a desired route. Pathing module 138 may also be configured to dynamically update the vehicle path as real-time information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with pathing module 138 to determine an appropriate path to avoid a detected obstacle.

Vehicle systems 140 may include a plurality of different systems/subsystems to control operation of vehicle 100. In this example, vehicle systems 130 include steering system 121, throttle system 122, brakes 123, transmission 124, electronic control unit (ECU) 125 and propulsion system 126. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. This may also include an assist mode in which the vehicle takes over partial control or activates ADAS controls (e.g. AC control systems 130) to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. As will be explained further below, processor can include one or more optical processor. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes.

Although one computing system 130 is illustrated in FIG. 1, in various embodiments multiple computing systems 110 can be included. Additionally, one or more systems and subsystems of vehicle 100 can include its own dedicated or shared computing system 130, or a variant thereof. Accordingly, computing system 110 is illustrated as a discrete computing system for ease of illustration only, and computing system 110 can be distributed among various vehicle systems or components.

Vehicle 100 may also include a wireless communication system (not illustrated) to communicate with other vehicles, infrastructure elements, cloud components and other external entities using any of a number of communication protocols including, for example, V2V, V2I and V2X protocols. Such a wireless communication system may allow vehicle 100 to receive information from other objects including, for example, map data, data regarding infrastructure elements, data regarding operation and intention of surrounding vehicles, and so on. A wireless communication system may also allow vehicle 100 to transmit information to other objects. In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle or platforms.

Vehicle Systems and ADAS for Conflict Zone Navigation

Figure 2:
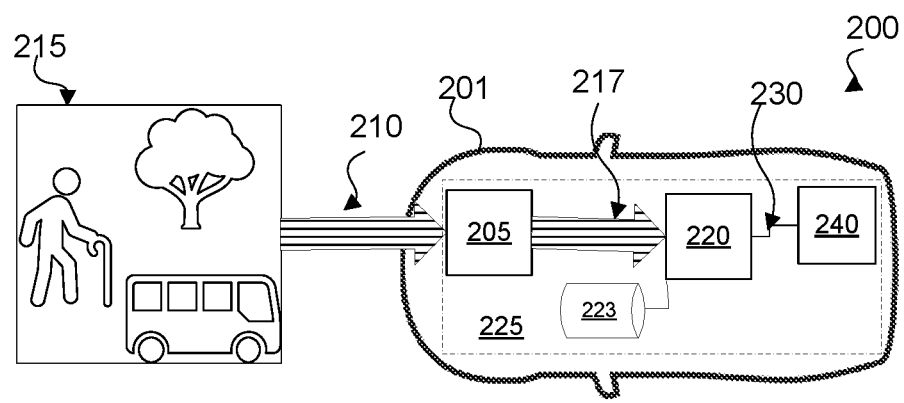
FIG. 2 shows a vehicle based system for navigating conflict zones according to aspects of the disclosure.

FIG. 2 shows a system 200 and vehicle 201 for navigating conflict zone(s) according to aspects of the disclosure. As used herein, the vehicle 201 which has such components as shown in FIG. 2 for navigating the conflict zone(s), can be an ego vehicle. The vehicle 201 may have one or more sensors 205 for receiving one or more reflected signals 210 from a surrounding environment 215. Surrounding environment 215 may be any environment in which the vehicle 201 or subsystems thereof functions. By way of example, one such environment generally involves a transportation environment such as roadways, parking lots, garages, and so on. Moreover, the surrounding environment 215 may also encompass an aviation environment for drones, helicopters, and so on, or a marine environment for boats, submarines, etc. In still further aspects, the surrounding environment 215 can include indoor environments, off-road environments, and so on. The surrounding environment 215 may include one or more obstacles (moving, stationary, or otherwise) which may obstruct or have the potential to obstruct a path of the vehicle 201.

One or more sensors 205 can be environment monitoring sensors. Sensors 205 can be internal and/or external to the vehicle 201. For example, one or more sensor 205 may be an optical, RF, and/or digital sensor. The sensor 205 may be active or passive. The sensor 205 can include an emitter and/or a receiver. In embodiments, the sensor 205 can be an active sensing device, in that an emitter emits a signal, and the reflected signal 210 includes at least a portion (such as 1%, 2%, 5%, 10%, 15%, etc.) of the emitted signal that has been reflected off of the surrounding environment. In one or more embodiments, a wavelength, power, phase, polarity, and/or other characteristic of the emitted light or RF signal can be modified by the vehicle (e.g. by emitter as will be discussed with reference to FIG. 3). In systems, the sensor 205 is passive in that photons or RF signals reflected from the surrounding environment have not been at least partially generated by the sensor.

The sensor 205 may generate a sensor signal 217. Sensor signal 217 may be based on the received one or more reflected signals 210. Sensor signal 217 may be an optical signal, for example carried on a fiber optic. Sensor signal 217 may be an electric signal (analog and/or digital).

For example, the sensor 205 can be a light detection and ranging (LiDAR) sensor mounted on the vehicle and configured to generate an optical signal based on a perceive light from a LiDAR sensor field-of-view. For example, the sensor 205 can be a GPS. GPS can be configured to provide a vehicle position for use in one or more computations as disclosed herein. In arrangements in which the sensor includes a plurality of sensors (e.g., multiple LIDAR sensors), the sensors can function independently from each other. Alternatively, two or more of the sensors can work in combination with each other. In such a case, the two or more sensors can form a sensor network.

Sensor 205 can be coupled to one or more processor(s) 220. Processor 220 can be an optical processor or optical processing component having one or more optical components. In one or more arrangements, the processor(s) 220 can be a main processor. For instance, the processor(s) can be an electronic control unit (ECU).

The vehicle 201 can include one or more data stores 223 for storing one or more types of data. The data store 223 can include volatile and/or non-volatile memory. Examples of suitable data stores include RAM (Random Access Memory), flash memory, ROM (Read Only Memory), PROM (Programmable Read-Only Memory), EPROM (Erasable Programmable Read Only Memory), EEPROM (Electrically Erasable Programmable Read-Only Memory), registers, magnetic disks, optical disks, hard drives, or any other suitable storage medium, or any combination thereof. The data store can be a component of the processor(s), or the data store can be operably connected to the processor(s) for use thereby.

The one or more data stores 223 can include program data, including programming code for executing one or more functions of systems or vehicles described herein, such as modules for executing one or more functions for operation of AV control systems 130 as described with reference to FIG. 1. Data in the data stores 223 can be updated, including for learning and/or recognition purposes. Data in the data stores 223 can be updated by learned and/or recognized operations during vehicle navigation. Data in the data stores 223 can be updated from one or more off-vehicle data stores and/or networks.

Further, the one or more data store 223 can include sensor data. In this context, "sensor data" refers to information produced by the one or more sensor 205, but also information that that sensor must use (e.g. for calibration). The one or more data store 223 can include modeling data, such as vehicle dynamics models. Modeling data can include one or more driving and/or vehicle control models, such as Weidemann human driver model. Modeling data can include weather based driving or vehicle control models. Modeling data can include maximum and/or minimum speeds, steering angles, accelerations of vehicles, size, weight, tire size, tire traction, clearance, color, audible features, visual features, known erratic behaviors, including based on an identity of the vehicle and/or vehicle type (vehicle class, automation class, whether service vehicle such as emergency vehicle). Modeling data can include training data, including for classification and/or other machine learning functions. Modeling data can include one or more weights, biases, setpoints as described herein.

Moreover, the one or more data store 223 can include one or more maps and associated mapping data. As previously noted, data in the data store 223 can be updated by on-vehicle (e.g. as learned from routine operation of the vehicle) and/or by off-vehicle 201 data. Mapping data, for example, can be updated on a routine basis, for example, by an off-vehicle network and/or server, and/or as learned by routing navigation of the vehicle. Mapping data can be updated, for example with learned locations, environmental conditions (such as weather), traffic conditions, speed limits (officially imposed, or learned based on history of driving through that conflict zone), etc. of control zones, conflict zones as will be discussed further herein. Mapping data can include location information (such as a location of a conflict zone and/or of known obstacles), information for features in the surrounding environment (such as a dimension of the conflict zone, and/or of an obstacle), and/or other information that could affect vehicle dynamics (such as the locations for blind zones, traffic signals, speed limits).

The sensor system and/or the one or more sensors 205 can be operably connected to the processor(s) 220, the data store(s) 230, and/or another element as shown in FIG. 2 and/or FIG. 1).

As an example, in one or more arrangements, the sensor 205 can include one or more radar sensors, one or more LIDAR sensors, one or more sonar sensors, and/or one or more cameras. The processor(s) 220 and/or associated modules (e.g., autonomous driving module or other module as shown in FIG. 1, including in AV control systems 130) executing thereon can be operably connected to communicate with the various vehicle systems (e.g. vehicle systems 140 as shown in FIG. 1) and/or individual components thereof. For example, the processor(s) can be in communication to send and/or receive information from the various vehicle systems to control the movement, speed, maneuvering, steering angle, heading, direction, etc. of a vehicle. As previously described, the processor(s) 220, and/or the autonomous driving module(s) may control some or all of the systems of a vehicle and, thus, the vehicle may be partially or fully autonomous.

Sensor 205, processor 220, data store 223 and/or actuator 240 can be part of ADAS 225. ADAS 225 can be real-time machine perception system. Thus vehicle 201 can have real-time perception system(s) that can be adapted for navigation in conflict zone environments and include an optical sensor (e.g. sensor 205) and an optical processing component (e.g. processor(s) 220) coupled to the optical sensor. ADAS 225 can provide navigation control signals (e.g. control signals to actuate the vehicle and/or operate one or more vehicle systems 140 as shown in FIG. 1) for the vehicle to navigate a variety of situations. Although ADAS 225 is shown here, and ADAS can be adapted as a driver assistance system, it is understood vehicle 201 can be driverless and/or fully autonomous without required driver or passenger intervention. As used herein, ADAS can be an autonomous vehicle control system adapted for any level of vehicle control and/or driving autonomy. For example, the ADAS 225 can be adapted for level 1, level 2, level 3, level 4, and/or level 5 autonomy. ADAS 225 can correspond to a real-time machine perception system for vehicle actuation in a multi-vehicle environment. ADAS 225 can be adapted to constantly perform one or more methods and or functions of the present disclosure (before, during, after the vehicle navigates a conflict zone).

ADAS 225 (e.g. any of the previously described modules) and/or the processor 220 can be configured to generate or otherwise control an actuation signal 230, which can be an electronic actuation signal. Actuation signal 230 can be based on the one or more reflected signals 210 from surrounding environment 215. Actuation signal 230 can be a control input for one or more actuator 240. Actuation signal 230 can be a control input for one or more AV control system(s) 130 (such as steering unit 136, throttle and brake control unit 135, sensor fusion module 131, computer vision module 134, pathing module 138, obstacle avoidance module 139) and/or vehicle system 140 (such as the ECU 125, throttle 122, steering 121, computer vision 134) and can be based on a vehicle acceleration, deceleration, heading, steering angle, and/or trajectory for the vehicle 201. Actuation signal 230 an be an electronic actuation signal. Actuation signal 230 can correspond to an actuation of the vehicle 201 for the purpose of at least one of: adjusting a relative velocity between the vehicle and an obstacle, matching the velocity of an obstacle (and/or another vehicle), adjusting a trajectory of the vehicle, adjusting a steering angle, and/or heading of the vehicle, or collision avoidance between the vehicle and the obstacle (i.e. another vehicle). The actuation signal 230 can allow for the vehicle successfully navigating into and through the conflict zone in the multi-vehicle merging and/or synchronization scenario.

One or more actuator 240 may be devices that execute running controls of vehicle 201. Actuator 240 may include, for example, a throttle actuator, a brake actuator, and a steering actuator. For example, the throttle actuator can control, in accordance with a control signal output from the ECU 125, an amount by which to open the throttle of vehicle 201 to control a driving force (the engine) of vehicle 201. In another example, actuators 240 may include one or more of motor generators, where a control signal is supplied from the ECU 125 to motor generators and/or other actuator(s) 137 to output motive force/energy. The brake actuator can be controlled, for example, in accordance with a control signal output from the ECU 125, which can correspond to the amount of braking force to be applied to each wheel of the vehicle, for example, by a hydraulic brake system. The steering actuator controls, in accordance with a control signal output from the ECU 125, can drive an assist motor of an electric power steering system that controls steering torque.

Processor 220 can include one or more modules. As previously discussed with respect to FIG. 1, the modules can be implemented as computer-readable program code that, when executed by a processor (i.e. processor 220 or another processor), implement one or more of the various processes described herein. One or more of the modules can be a component of the processor(s), and/or one or more of the modules can be executed on and/or distributed among other processing systems to which the processor(s) is operably connected. The modules can include instructions (e.g., program logic) executable by one or more processor(s). Alternatively, or in addition, one or more data stores may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In one or more embodiments, the processor 220 can be coupled to a separate automated vehicle actuation component which can generate the electronic actuation signal 230. The processor and/or the automated vehicle actuation component can be coupled to at least one actuator 240 or actuation component for actuation of the vehicle 201 into the multi-vehicle conflict zone while avoiding collisions. The actuator can include at least one motor, axle, power engine, internal combustion engine, and/or at least one other controller (such as a motor controller). The actuator 240 can depend on the type of vehicle 201.

In one or more embodiments, it can be appreciated that vehicle 201 includes many elements, not all of which are shown in FIG. 1 and/or FIG. 2. In addition it may not be necessary for a vehicle 201 and/or a an ADAS 225 to have all the elements shown in FIG. 1 and/FIG. 2. Further, the elements shown may be physically separated by varying distances and one or more of the elements can be physically external to the ADAS 225 and/or to the vehicle 201.

Vehicle 201 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 2 are shown as being partitioned in a particular way, the functions of vehicle 201 can be partitioned in other ways. For example, various vehicle systems and subsystems can be combined in different ways to share functionality.

Optical Neural Network

Figure 3:
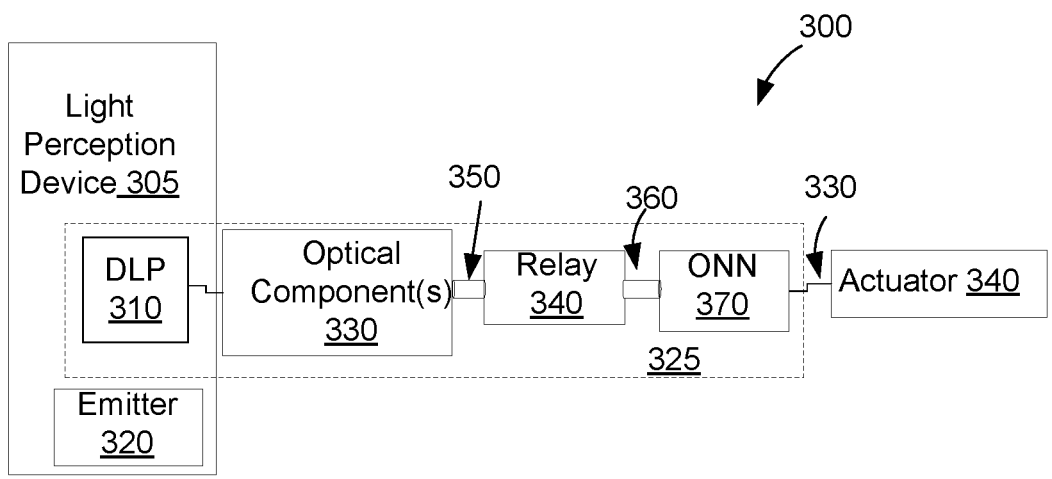
FIG. 3 illustrates an example optical processing system with which embodiments of the disclosed technology may be implemented.

FIG. 3 illustrates an example optical processing pathway 300 with which embodiments of the disclosed technology may be implemented. As shown, optical processing pathway 300 can be implemented at least partially as part of an ADAS 325. Optical processing pathway 300 can include an optical (or non-optical) sensor, such as a light perception device 305. As shown in FIG. 3, the optical pathway 300 is an example shown for a single emitter of the light perception device 305 (e.g., LiDAR sensor). The optical processing pathway 300 can be a detector of the device 305 with built-in processing capabilities. Accordingly, the device 305 is illustrated as including a digital light processor (DLP) 310 and a single emitter 320. In alternative approaches, the device 305 can substitute other light processors for the DLP 310 as outlined subsequently. Additionally, it should be appreciated that in implementation, the device 305 may include multiple sets (e.g., 8, 32, 64, etc.) of emitters 320 and/or DLPs 310. In either case, the emitter 320 can generate and transmit light into the surrounding environment 215. As previously mentioned with reference to FIG. 2 emitter 320 can produce light 210 with defined characteristics such as wavelength, phase, and so on.

The device 305 may alternatively substitute the DLP 310 for a separate type of light processor that is embedded in the optical fiber as an electro-optic switch, fiber modulator, etc. In one approach, the device 305 alternatively implements the DLP 310 as a spatial light modulator in conjunction with a polarizer, a Pocket's cell, an electro-optic modulator (EOM) (e.g., an electrooptic crystal), or another suitable gating mechanism that focuses (e.g., switches) reception to actively time the provided light 210. Furthermore, the DLP 310, in one or more embodiments, is a DLP array that operates on all inputs into the optical processing pathway 300. The DLP 310 or other light processor as may be substituted receives the reflected light 210 and provides the light 210 to a set of optics including the optical relay 340. In general, the DLP 310 or other light processor functions to clock reception of the light 210 in coordination with transmission of the light 210 by the emitter 320 such that the DLP 310/light processor permits the reflected light 210 to enter the optical pathway 300 according to a particular clocking while excluding other ambient noise/signals.

In either case, the device 305 can provide the light 210 that is gated according to transmission by the emitter 320 to subsequent components within the optical pathway 300. As illustrated in FIG. 3, the optical pathway 300 can include one or more intervening optical components 330 between the DLP 310 and the optical relay 340. For example, the optical components 330 of optical pathway 300 can include one or more bandpass filter, notch filter, low pass filter, highpass filter, polarizer, optical metamaterial, or a lens or other optic with an anti-reflective coating. In one embodiment, a bandpass filter can perform additional conditioning on the light 210 to filter noise from the optical signals while the lens and anti-reflective coating generally function to pass the light 210 into optical fiber 350. The optical fiber 350 can maintain the optical pathway 300 into the optical relay 340. Optical fiber 350 can include one or more fiber lens. Optical relay 340 can further adapt the light 210, for example, to be appropriately processed by the ONN 370. For example, Optical relay 340 can take one or more forms depending on, for example, a wavelength of light associated with the light perception device 305, a particular platform (such as the type of vehicle) and/or a particular surrounding environment 215. Optical relay 340 can include at least one amplifier, polarizer, optical metamaterial, and/or a waveplate. For example, the amplifier can boost the original optical signal, which may have been attenuated. A polarizer can filter the optical signal to condition the light, for example to have a consistent polarization. An output of the optical relay 340 can be coupled with an additional optical fiber 360 that guides the light 210 into the ONN 370 via, for example, a fiber lens.

The sensor signal 217 or processed sensor signal (e.g. shown at optical fiber 360) can be received at the ONN 370 by way of a photonic waveguide, a fiber optic connection, or any other suitable pathway. The coupling between the optical fiber 360 and the ONN 370 may be a fiber to silicon photonics waveguide transition, a fiber-to-fiber connection, or another suitable pathway that maintains the light 210 as an analog optical signal and that is generally dependent on an implementation of the ONN 370 (e.g., photonic integrated circuit (PIC), fiber bundle, etc.). The ONN 370, in one arrangement, performs optical processing on the light 210 according to a deep learning algorithm and by using optical components. Thus, the ONN 370 can include, in one or more arrangements, a photonic integrated circuit (PIC), a fiber optic bundle, a set of optical gratings (e.g., multiple groove gratings), a set of optical freespace elements, a set of beam splitters, a set of phase shifters (e.g., liquid crystal phase shifters, electro-optic phase shifters, etc.), an array/mesh of Mach-Zehnder interferometers, and so on.

In general, the ONN 370 can include a combination of the noted elements in particular arrangements to achieve the functionality of artificial neural networks (ANNs) such as convolutional neural networks (CNNs), recurrent neural networks (RNNs), long short-term memory (LSTM) networks, autoencoder networks, deconvolutional networks, support vector machines (SVMs), and so on. Moreover, the ONN 370 generally provides an output (i.e., result) of processing to a photoreceiver/detector to perform optical to electrical conversion of the final result.

In some embodiments, processor 220 can be an optical processor, electro-optical processor, optical processing component, neuromorphic processor, optical machine perception device, and/or optical neural network (ONN). In one or more embodiments, processor 220 can be or at least partially include ONN 370 as described herein. In one or more embodiments, the ONN 370 can include at least one optical, RF, and/or digital input (for example, configured for receiving sensor signal 217). ONN 370 (and/or processor 220) can include at least one light source such as a laser source, and/or waveform generator. The laser source and/or waveform generator can be for operating the processing component and/or transforming input signals to be processed. In some embodiments, the ONN 370 (and/or processor 220) can transform the RF and/or digital input into an optical signal to be processed by optical components of the ONN. For example, sensor signal 217 can be a GPS sensor input, and the GPS sensor signal can be impinged on a signal from the laser source to be processed by the ONN. ONN 370 can include an optical monitor for monitoring an input and/or output signal.

In some embodiments, the ONN 370 can include at least one external and/or internal non-optical processing component (such as a field programmable gate array (FPGA), CPU, GPU), and/or memory (e.g. RAM, EEPROM).

In some embodiments, the optical processor can be a chip-scale photonic device, such as a chip-scale silicon photonic device. That is, one or more of the components embodied in the photonic processor can be silicon photonic components provided in the form of a silicon-based chip that may also include electronic control circuitry. The optical or electro-optical processor can be embodied across multiple silicon photonic devices and/or other components that are operably connected via fiber optics or other optical pathways. For simplicity, where this disclosure may refer to an ONN, any other optical processing architecture may be assumed. Accordingly, ONN as described herein can be implemented as a deep learning neural network such as a convolutional neural network, recursive neural network, or another form of artificial neural network that is capable of performing the tasks noted herein. ONN as described herein are capable of performing at least one of a nonlinear programming task, i.e. solving nonlinear control or optimization problems with nonlinear objective functions and/or nonlinear constraints. These problems may be solved with a configured recurrent neural network, such as a Hopfield network.

ONN as described herein can perform feedforward inference tasks for computing functions of inputs as quickly as possible. These problems and/or tasks are typically well-behaved in the sense that the outputs change continuously with small changes to inputs. These can also be solved by classification tasks, in that the outputs can represent discrete answers or decisions for different inputs. Further, ONN as described herein can perform feedback control tasks based on interactions with a changing environment.

In systems, the ONN may be configured to receive sensor signal 217 as shown with reference to FIG. 2. As previously discussed, sensor signal 217 may be an optical, RF, and/or digital electronic signal. For example, sensor 205 can be a light perception device (such as light perception device 305). Sensor signal 217 may be processed, amplified, and/or filtered before reaching the ONN, and/or at the ONN. In systems, one or more switch can couple the sensor 205 to the ONN. For example, switch may be an optical or electronic relay, and/or an optical or electronic switch. For example, sensor 205 can generate an optical sensor signal 217 based on a light reflected from the surrounding environment 215 and received at the sensor 205. The system (e.g. by one or more other processors coupled to the sensor) can determine the vehicle 201 is at or near a multi-vehicle conflict zone, and thus activate the switch coupling the ONN to the sensor by an activation signal. The sensor signal 217 can be filtered (e.g. by optical or electronic bandpass filter, or any combination of low pass filter, high pass filter), amplified, or otherwise modified. In systems, the sensor signal 217 can be transformed into a digital signal, and/or into an optical signal from a non-optical signal, for example by impinging on or combining with a laser generated signal.

It can be appreciated that ONN 370 can include one or more, two or more, etc. signal processing components for handling the light and directing the light for processing, and/or one or more optical processing components which can emulate neurons (or processing nodes) for processing the light. As used herein, neurons can mean neural nodes and/or processing nodes. Neuron(s) can perform small bits of computation, and can be arranged to perform computations in parallel and/or cascaded fashion. The configuration memory of the network is distributed in the tuning of optical components, which perform weighted addition inside each photonic neuron.

Nodes may be processing network nodes. Processing network nodes may perform at least one of a computational (weighted addition, integration, thresholding), spiking, networking, and/or broadcasting function.

In some embodiments, a subset of neurons/nodes (e.g. feedforward inference, classification and/or recognition neurons) can be dedicated to vehicle recognition, tracking, and/or classification. These can be machine perception nodes or neurons. In some embodiments, neurons and/or nodes are configured to perform one or more machine learning tasks, such as recognition. Based on feedforward inference, classification and/or recognition, the embodiments as described herein can determine at least one of a position, displacement, speed, safety distance, $\delta_i(t)$, and/or acceleration/deceleration of a vehicle. Moreover, embodiments as described herein can determine at least one conflict zone and/or conflict scenario.

As previously noted, nodes (or neurons) may be machine perception nodes. Thus a subset of nodes of the ONN 370 can be machine perception nodes. Machine perception nodes may perform at least one of a machine perception function such as an object recognition function, a tracking function, a classification function, a semantic segmentation function, and so on. For example, machine perception nodes may be responsible for the system recognizing an upcoming conflict zone and/or conflict scenario.

Figure 4A:
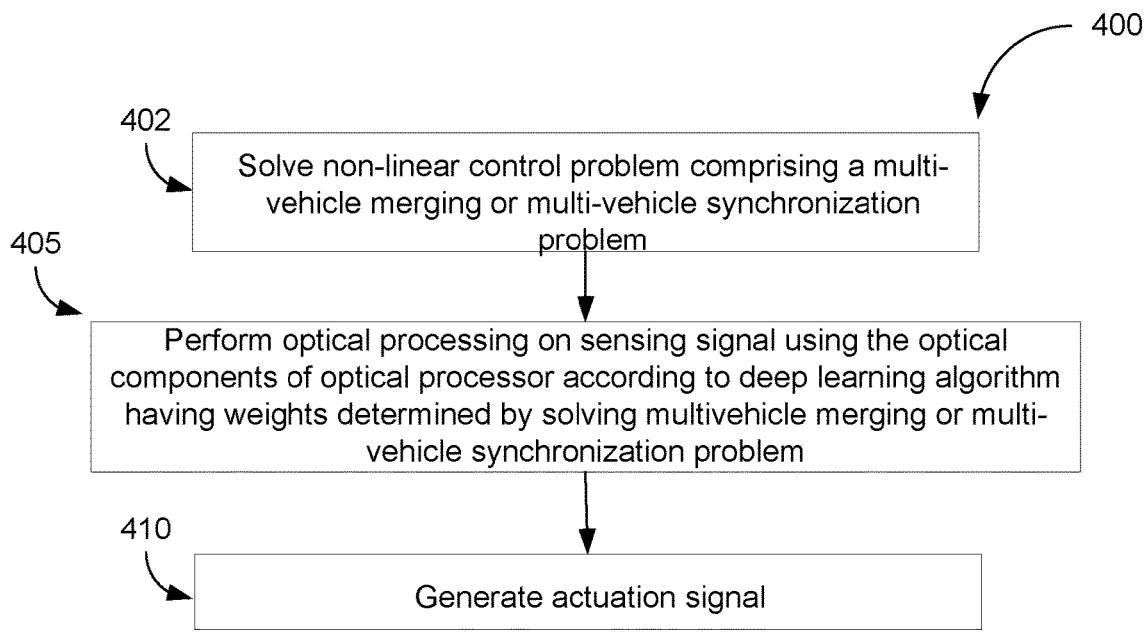
FIG. 4A shows a method of navigating a conflict zone according to aspects of the disclosure, including by optical processing a sensing signal using optical components of an optical processor according to deep learning algorithm having weights determined by solving multi-vehicle merging or multi-vehicle synchronization problem(s).

FIG. 4A shows a method 400 of navigating conflict zone(s) using an optical processor or ONN (e.g. ONN 370 of FIG. 3 and/or processor 220 of FIG. 2) according to aspects of the disclosure. ONN can be processor 220 and/or ONN 370 as described herein. Method 400 can include step for the vehicle recognizing it is or near a conflict zone as described herein. This step can be implemented, for example, by analyzing one or more sensor signal 217, and as described in relation with FIG. 2. Method 400 can include step 402 for solving a control problem, such as a non-linear control problem. The control problem can be a vehicle dynamics control problem, i.e. solving the (nonlinear) control problem can include solving a vehicle dynamics control problem. Vehicle dynamics control problem can correspond to at least one of a vehicle pathing, sensor fusion, vehicle control, and/or obstacle avoidance problem. Non-linear control problem can include solving a multi-vehicle merging or multi-vehicle synchronization problem as will be explained further below (e.g. in relation to FIG. 7A). Solving the control problem can include the vehicle recognizing (e.g. by ADAS 225 and/or 325) that it is at or near a conflict zone, and/or recognizing a specific conflict scenario (e.g. arrangement of vehicles and/or other obstacles at a conflict zone). Solving the control problem can include determining one or more vehicle states (e.g. trajectories, velocities, and the like) for vehicles (e.g. the ego vehicle and/or other vehicles) at or near the conflict zone (i.e. the vehicles part of conflict scenario). Solving the control problem can include determining a time, trajectory, vehicle state, and/or path for the vehicle to cross the conflict zone so that collisions are avoided, and/or trajectories of other vehicles are respected. Solving the nonlinear control problem can include determining if one or more constraints on the control problem are violated. Example constraints will be analyzed further below.

Method 400 can include step 405 for performing optical processing on sensing signal. Step 405 can include performing optical processing on sensing signal 217 according to a deep learning algorithm. As previously described, optical processing can be performed by using optical components of an ONN 370.

In some embodiments, optical processing at step 405 can be performed on activation of an activation signal. In one or more embodiments, the activation signal can be generated when the ADAS 225 detects that it is at or near a conflict zone and/or conflict scenario, for example by one or more sensors 120, 205.

Optical processing can be performed according to deep learning algorithm having weights and/or biases determined by solving multi-vehicle merging or multi-vehicle synchronization problem(s). Multi-vehicle merging and multi-vehicle synchronization problem(s) will be explained below. The deep learning algorithm can be implemented as an ANN and/or ONN. The deep learning algorithm can be implemented as at least one of a feedforward neural network, convolutional neural network, long short-memory network, autoencoder network, deconvolutional network, support vector machine, inference and/or trained neural network, or recurrent neural network, etc. The deep learning algorithm can solve at least one control problem, including a model predictive control (MPC) problem. For example, as will be analyzed more specifically below, the deep learning algorithm can include solving a model predictive control algorithm. As will be analyzed more specifically below, the ONN can implement a recurrent neural network to implement and MPC algorithm as mapped to a quadratic problem. The recurrent neural network can be implemented by: i) mapping the model predictive control algorithm to a quadratic programming problem and ii) solving the quadratic programming problem with the recurrent neural network.

For determining the weights and/or biases (i.e. of the deep learning algorithm and/or MPC algorithm) multi-vehicle merging or multi-vehicle synchronization problem(s) can be solved in step 402. In one or more embodiments, step 402 and step 405 can be performed recursively such that weights and/or biases are updated continuously, and such that optical processing is continuously performed on the sensing signal, e.g. sensor signal 217. Method 400 can further include step 410 for generating an actuation signal. The actuation signal can be actuation signal 230. In one or more embodiments the actuation signal 230 can be generated based on an output of the deep learning algorithm. In one or more embodiments the actuation signal 230 can allow for navigation of the vehicle through the conflict zone. As previously discussed, actuation signal 230 can control one or more vehicle system(s) 140, including for vehicle navigation into and/or through a conflict zone and/or conflict scenario.

Model-Predictive Control (MPC) Solver

As previously mentioned, one or more deep-learning algorithms as described herein can be implemented on the ONN 370.

Figure 4B:
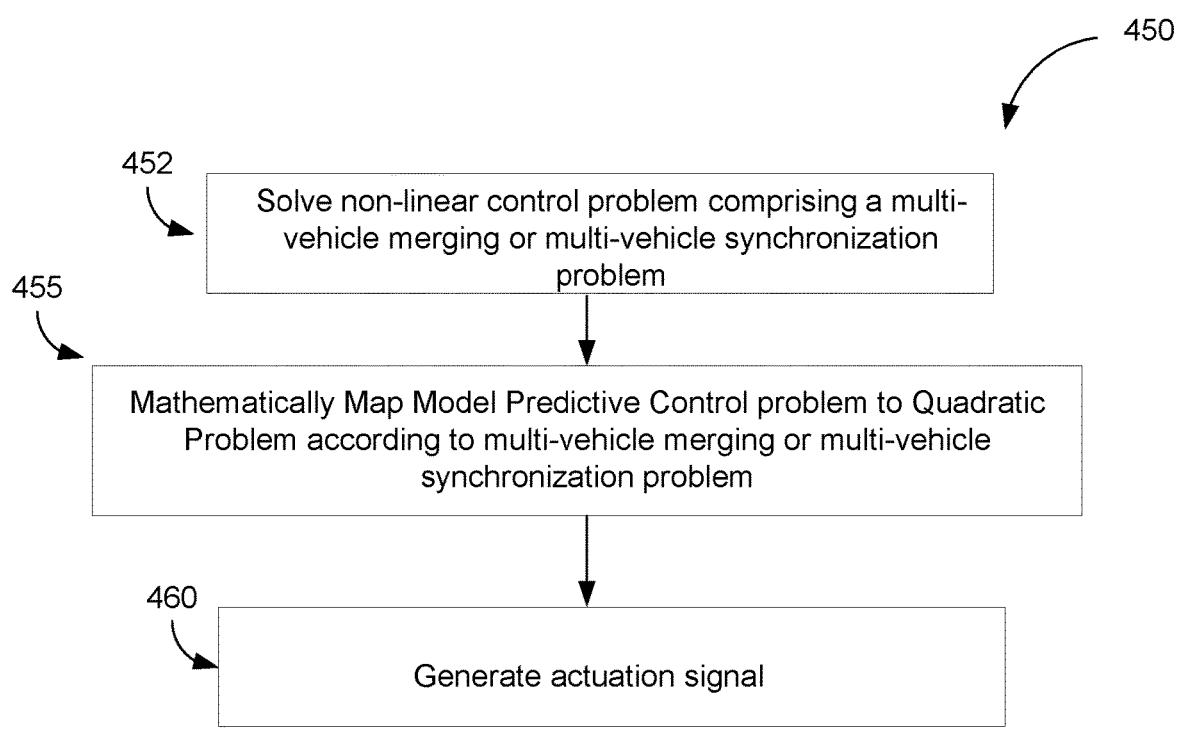
FIG. 4B shows a method of navigating a conflict zone according to aspects of the disclosure, including by mapping a model predictive control program to a quadratic program.

FIG. 4B shows a method of navigating a conflict zone according to aspects of the disclosure, including by one or more deep-learning algorithms which can include mapping a model predictive control program to a quadratic program by solving multi-vehicle merging or multi-vehicle synchronization problem(s). Method 450 can be a method of navigating conflict zone(s) using an optical processor or ONN according to aspects of the disclosure. Method 450 can include step 452 for solving a non-linear control problem. The nonlinear control problem can be a multi-vehicle merging and/or multi-vehicle synchronization problem. Examples of such merging and/or synchronization problems will be explained with reference to FIG. 7A-7B. Step 452 can include solving the nonlinear control problem in view of constraints on the control problem. Step 452 can be performed with reference to the multi-vehicle merging and/or multi-vehicle synchronization control problem as shown with reference to the examples of FIG. 2A and/or FIG. 2B, and/or step 402 of method 400.

Method 450 can include step 455 for mathematically mapping MPC problem to a quadratic problem which will be explained in further detail below. Method 450 can further include step 460 for generating an actuation signal as described herein. In one or more embodiments the actuation signal 230 can be generated based on an output of the deep learning algorithm and/or based on the model predictive control problem as mathematically mapped to the quadratic problem according to multi-vehicle merging or multi-vehicle synchronization problems described herein. In one or more embodiments the actuation signal 230 can allow for navigation of the vehicle through the conflict zone.

Deep learning algorithm as described herein (e.g. at step 405 of method 400 and/or step 455 of method 450) can include MPC algorithm or MPC solver. MPC algorithm can be used to implement one or more control problem, and/or constraint checking problems as described herein. MPC can be used in combination with or alternatively to proportionalintegral-derivative (PID) control algorithms. Method 450 can include solving MPC algorithm. Method 450 can include step 455 for mathematically mapping MPC problem to a quadratic problem. The MPC algorithm can start by mapping the control problem into a quadratic programming problem. Mapping the control problem into a quadratic control problem can include mathematically solving the control optimization problem with quadratic objective function linear constraints at discrete timesteps, including based on information obtained at step 452 (e.g. based on one or more vehicle states and/or control input). Mathematically solving the control optimization problem with quadratic objective function and set of linear constraints at discrete timesteps can include determining that:

$$\min_{\vec{X}} \frac{1}{2} \vec{X}^T P \vec{X} + \vec{q}^T \vec{X} \text{ subject to } G\vec{X} \leq \vec{h}.$$

$\vec{X}$ can represents the change of the control variables (e.g. the change of acceleration, and/or steering angle). Control variable can be control inputs for actuator 240. In or near such multi-vehicle conflict zones, vehicle response to the same or other vehicle movements can be erratic and/or unpredictable. Vehicle responses can be, for example, counter responses to the movements of other vehicles. P can model the vehicle 201 response to these changes (i.e. changes to control inputs for the actuator 240). $\vec{q}$ can model the relative position and velocity between the vehicle(s), and/or the conflict zone, and/or the motion of the vehicle and/or a vehicle state. In some embodiments, P and/or $\vec{q}$ can be determined based on solving a multi-vehicle merging and/or multi-vehicle synchronization problem as determined at step 402 of method 400 as shown in FIG. 4A, and/or as shown with reference to the example of FIG. 2A or FIG. 2B.

G can represent which parts of the motion of the vehicle 220 (and/or vehicle 201) should be constrained (see for example, vehicle state constraint, acceleration and/or speed constraints, lateral collision constraints, and/or rear-end collision constraints). G can represent which parts of the motion of the vehicle should be constrained in solving the multi-vehicle merging and/or synchronization problem. $\vec{h}$ can represent how close or far from violating those constraints the system and/or vehicle is. The quadratic problem can be based on vehicle states, control inputs, and/or speed and/or acceleration for the vehicle and/or other vehicles within the conflict zone. Vehicle states can include at least one of acceleration state, positions, a trajectory state, steering angle, or speeds/velocities. The quadratic problem can be based on solving non-linear control problem including solving multi-vehicle merging and/or multi-vehicle synchronization problem as determined at step 452 and/or step 402.

In some embodiments, G and/or $\vec{h}$ can be determined based on constraints of the system. Constraints of the system can specifically be constraints on the control problem for examples as applied to a multi-vehicle merging and/or multi-vehicle synchronization control problem which will be explained in detail below (e.g. with reference to FIG. 7A and FIG. 7B.) In some embodiments, G and/or $\vec{h}$ can be determined based on constraints of the system as determined at step 402 of method 400 as shown in FIG. 4A (and/or at step 452 of method 450 of FIG. 4B.)

An MPC problem, and/or quadratic program solver, for example as described with reference to step 455 of method 450 (and/or step 405 of method 400) can be implemented with a neural network architecture, e.g. a continuous time recurrent neural network (CT-RNN). The CT-RNN can solve the quadratic objective function using a network of neurons. The quadratic program solver can be implemented on ONN 370 and/or processor 220 at least partially configured as a CT-RNN. The model of CT-RNN can be expressed as a set of ordinary differential equations coupled at least through a weight matrix.

Figure 5:
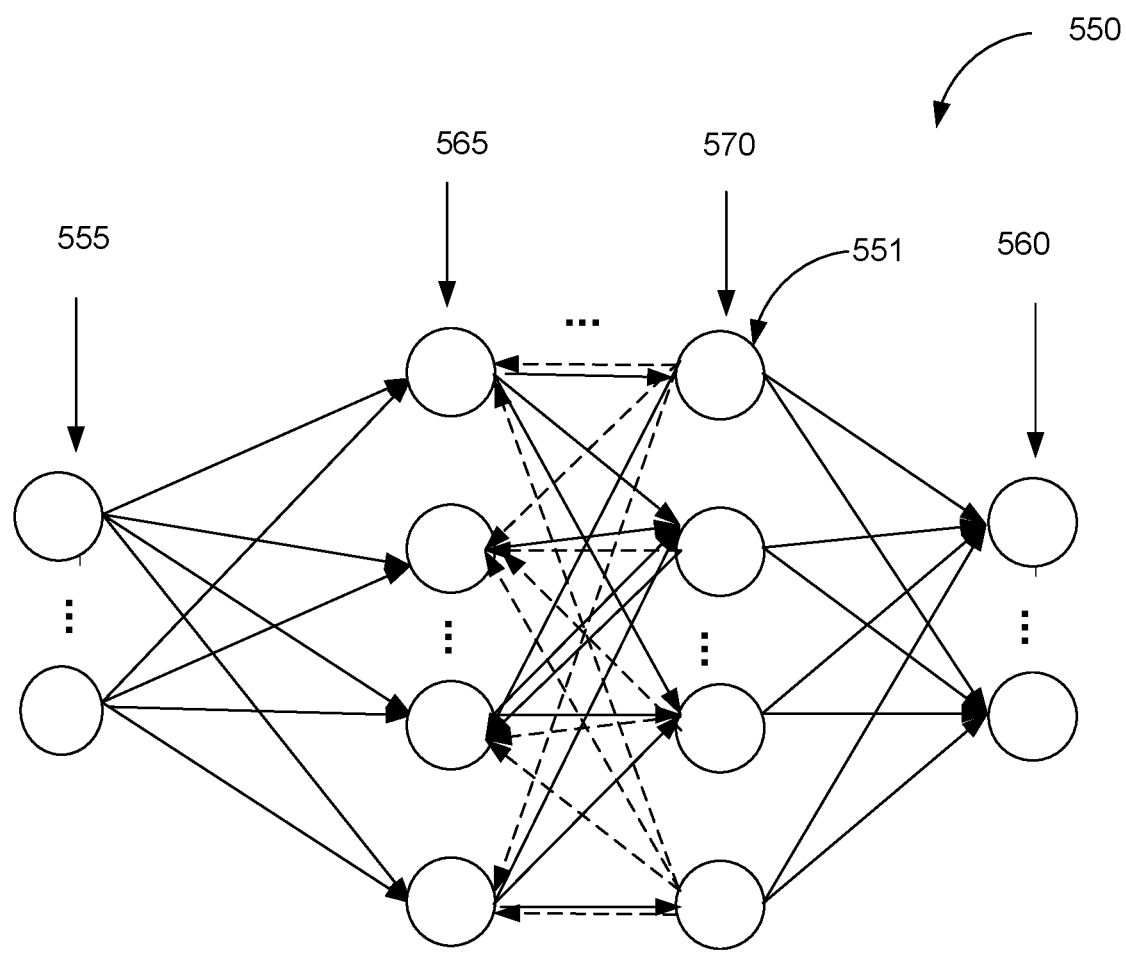
FIG. 5 shows a schematic figure of an example construction of a neural network for an optical neural network according to aspects of the disclosure.

FIG. 5 shows a schematic figure of an example construction of a neural network 550 that can be a QP solver with CT-RNN, and/or solve at least one control problem as described herein according to a deep learning algorithm. Neural network 550 can be implemented on ONN 550, processor 220, or other processor as described herein. Neural network 550 can be used to perform optical processing on sensing signal 217 (and/or processed sensor signal (e.g. shown at optical fiber 360)) as described herein. Neural network 550 can be implemented to solve at least one control problem, including as described herein. There can be a one-to one correspondence between every neuron or node 551 in neural network 550 and a photonics hardware counterpart. Neural networks as described herein are not limited to the number of nodes and configuration of nodes as shown here. As used herein, a layer can include one or more neuron or neural node, with no, or at least one connection between nodes of that layer and/or of other layers. A layer can include a subset of neurons, and/or a population of neurons. Each subset of neurons and/or population of neurons can have a different connection between neurons. The strength of the connection(s) can be based on weight matrix and/or bias vector, which can each can be fixed or modified or varying between steps.

Neural network 550 can include at least one input layer 555. Input layer 555 can be configured to receive at least one input. Input can be $\vec{q}$, one or more vehicle states, control input, and/or at least one sensor data. For example, neural network 550 can receive as inputs at the input layer 555 at least one vehicle state for one or more vehicles as described herein. The input can be and/or correspond to sensor signal 217. Neural network 550 can include one or more output layer 560. Output layer 560 can be configured to interface with another part of the system. Output layer 560 can provide at least one solved output for the control problem. For example, the solved output can be at least one acceleration, velocity, position, heading, trajectory, steering angle for vehicle 201. The solved output can correspond to one or more actuation signal 230 and/or 330 as described herein.

Neural network 550 can solve one or more control problems as described herein (including constraint-checking the control problem). Neural network 550 can output at output layer 560 an output signal (which can be an optical signal) based on at least one of a vehicle state, heading, steering angle, acceleration, etc. for the vehicle. The system can then generate an electronic actuation signal 230 as described herein, for example, based on output of neural network 550. In some embodiments, the output at layer 560 is only accessed by the rest of the system, for example, to generate electronic actuation signal 230 only after neural network 550 has converged to a solution, i.e. after one or more "iterations".

Neural network 550 can include one or more hidden layers. For example, neural network can include one or more QP solver layer (or solver layer) 565. QP solver layer 565 can be configured to, based on inputs, recursively converge to a solution for the control problem, i.e. after one or more "iterations".

QP solver layer 565 can be configured with a weight matrix based on P. QP solver layer 565 can be configured with a bias matrix based on $\vec{q}$. In some embodiments, weights and/or bias are determined by solving multi-vehicle merging or multi-vehicle synchronization problem.

In one or more embodiments, a subset of constraint enforcing neurons (or constraint checking neurons) can be dedicated to enforcing constraints on the motion of each vehicle as solved by the solver neurons. Neural network 550 can include one or more constraint checker layer 570 or constraint enforcing layer, with constraint checker layer 570 having at least one constraint enforcing neuron or neural node. The number of constraint enforcing neurons can be based on constraints (such as the number of inequalities the constraints can be simplified to), and the required prediction horizon. For example, six constraint inequalities and a prediction horizon of 3 steps can be implemented by 18 constraint neurons. The connection between constraint enforcing neurons and solver neurons can be such that the constraint enforcing neurons fire (i.e. activate) when a constraint is violated. The connection between constraint enforcing neurons and solver neurons can be such that constraint enforcing neurons only fire when a constraint is violated. The connection between constraint enforcing neurons and solver neurons can be such that constraint enforcing neurons fire when a constraint is violated by a specific magnitude, and/or within some number of iterations (e.g. twice in the last two iterations, twice in the last three iterations, etc.) The connection between constraint enforcing neurons and solver neurons can be such that when the constraint is violated, constraint enforcing neurons provide a penalty to the solver neurons by way of a feedback mechanism. The feedback mechanism can include inhibiting the output of the solver neurons. The feedback mechanism, and/or the connection can be given by constraint matrix G (or the transposition thereof). Matrix G can be similar to P, and can represent which part of the vehicle's motion is constrained. In some embodiments, the constraint checking neurons are configured to enforce at least one constraint on the control problem, including for example, a vehicle dynamics constraint, rear end safety constraint, lateral collision constraint and/or other control problem restraint as described herein, including as determined by solving multi-vehicle merging or multi-vehicle synchronization control problem. Example constraints on the control problem will be shown with reference to FIG. 7A and FIG. 7B below.

Constraint(s) checker layer 570 can have one or more constraint checking neurons. Constraint(s) checker layer 570 and/or constraint checking neuron(s) can be configured to enforce one or more constraints on the control problem as described herein. For example, one or more connections from the QP solver layer 565 to the constraint checker layer 570 (shown here as arrows) can be configured with weights based on constraint matrix G. One or more connections (shown here as dotted arrows) from the constraint checker layer 570 to QP solver layer 565 can be configured with weights based on the transposition of constraint matrix G, $G^T$, (and/or bias vector, such as $\vec{h}$) such that neurons (nodes) of the constraint checker layer 570 fire only when the QP solver layer 565 is converging at or near a constraint.

Although a recurrent neural network 550 is shown in FIG. 5, this is merely shown as an example. As previously discussed, ONN 370 and/or processor 220 as described herein can implement one or more different types of neural networks and/or deep learning algorithms. These learning algorithms can be performed in parallel with each other, one or more ONN and/or processor. For example, in addition to (recurrent) neural network 550, ONN 370 and/or processor 220 can include nodes implemented as one or more classification nodes. One or more classification nodes can be, for example, for performing deep learning based machine vision image recognition (e.g. to recognize one or more vehicles, obstacles, conflict zones, and/or conflict scenarios in the surrounding environment). One or more classification nodes can be, for example, for classifying likelihood of safe and comfortable merging, for example based on signal 210 and/or signal from one or more sensors (e.g. sensors 120 shown in FIG. 1, light perception device 305, sensor 205, etc.)

Constructing the ONN

As previously discussed, the CT-RNN and/or other neural networks (e.g. to implement MPC algorithm) as described herein can be built on a photonic system, such as ONN. Each of the neuronal characteristics can be implemented in photonic devices. Nodes and/or neurons can be photonics nodes and/or photonics neurons and implemented in physical optical and/or photonics components. For example, the activation function of the neuron node can be implemented by an excitable laser, such as a quantum dot laser grown on silicon, or a modulator. The weighted connection can be implemented by and/or calibrated by a microrring (MRR) modulator neuron weight bank as known in the art (see A. N. Tait, M. A. Nahmias, B. J. Shastri, and P. R. Prucnal, "Broadcast and weight: An integrated network for scalable photonic spike processing," J. Lightw. Technol., vol. 32, no. 21, pp. 4029-4041, November 2014.) The MRR can include a balance detector to determine a tuning of the MRR between on- and/or off-resonance states. The detected signal can drive an electro-optic converter of the MRR and/or the ONN, such as a laser.

Weights can (in addition or alternatively to the MRR) be controlled by a (tunable) filter bank (e.g. optical filter bank, spectral filter bank). In one or more embodiments, phase shift layers, such as electro-optic phase shifters, MEMs-based phase-shifters, and/or thermo-optic phase shifters can be formed about waveguides of the ONN and are adjustable to vary the weights which can affect interference and/or quantity of the light at and/or between the photonic neural nodes.

The bias can be a DC and/or AC bias as known in the art, such as by controlling the DC current into the laser or modulator or by external AC perturbation provided by external photocurrents. The time constant of post-synaptic node can be the CMOS Amplifier RC time constant.

In one or more embodiments, the weights and/or bias of the ONN can be trained by a supervised learning algorithm. For known functions (e.g. known input values) and known network shape, it is possible to deterministically compile a proper weight matrix for solving the problem, for example by applying a neural network configuration with minimal training by a neural engineering framework (e.g. with nengo compiler). In one or more embodiments, starting weights, and/or biases can be determined by solving one or more multi-vehicle merging and/or multi-vehicle synchronization problems as described herein. In one or more embodiments, the weights and/or biases can be updated (i.e. dynamically and/or in real-time or near-real time) based on responses of the system. In one or more embodiments, the weights and/or biases can be updated (i.e. dynamically and/or in real-time or near-real time) based on successful and/or unsuccessful navigation into and/or out of the conflict zone. Successful navigation can include ones without collisions, and/or with minimized stop and go driving. In conflict scenarios, systems and methods as described herein can allow for one or more vehicle to successfully navigate one or more conflict scenario in a safe, effective, and/or efficient manner and time frame. In conflict scenarios, systems and methods as described herein can allow for one or more vehicle to successfully navigate one or more conflict zones without communicating and/or coordinating with other vehicles, infrastructure, and/or obstacles.

Learning Operations of the ONN

As previously noted, ONN as described herein can perform one or more machine learning tasks. In one or more embodiments, one or more weights, biases, and/or model parameters can be updated depending on an outcome of the vehicle (the ego vehicle, or by observation of another vehicle) traversing the conflict zone. The system can train, update, and/or calibrate one or more systems, methods, tasks, operations, problems, and/or programs described herein depending on one or more outcomes (e.g. successful and/or unsuccessful outcomes). For example, ADAS (including one or more optical or other sensors) may determine the vehicle is approaching multi-vehicle conflict zone. The system can update, log and/or record one or more data in one or more data store 223, based on the vehicle's (and/or another recognized vehicle's) successful and/or unsuccessful navigation of the conflict zone, and/or based on a successful and/or unsuccessful recognition of the conflict zone and/or conflict scenario. For example, an unsuccessful navigation can include a lateral, rear, and/or front-end collision, a violation of one or more constraints as described herein, excessive stop-and-go driving, exhibition of erratic driving behavior, and/or excessive fuel and/or energy consumption.

As previously discussed, the ONN can perform one or more classification and/or machine learning tasks. As previously discussed, nodes (or neurons) of the ONN may be machine perception nodes. Embodiments of ONN (and/or other processor) described herein can classify the likelihood of successful and/or unsuccessful outcomes for the multi-vehicle merging and/or multi-vehicle synchronization events. Such events can include the vehicle navigating through the conflict zone. One or more weights, biases, training data, and/or model parameters can be updated depending on the classification (e.g. based on a successful or unsuccessful classification). Thus, the system can train, update, and/or calibrate one or more systems, methods, tasks, operations, problems, and/or programs described herein based on the classification.

As previously discussed, in one or more embodiments, processor(s) and/or associated modules (e.g., autonomous driving module) executing thereon can be operably connected to communication modules configured to communicate with other vehicles and/or with infrastructure systems. Data received from other vehicles and/or from infrastructure can be used to train, calibrate, and/or update one or more systems, problems, methods, tasks, operations, and/or programs as described herein. For example, data received from other vehicles and/or from infrastructure can be used to determine and/or verify if a classification task was successfully performed (or not), and/or if a navigation into and/or through a conflict zone was performed successfully (or not).

Data that can be updated can include one or more training data, mapping data (such as the location of the conflict zone, the type of conflict zone (e.g. merging zone), a size and/or length of the conflict zone, safety distances to use, etc.), and/or modeling data (such as vehicle dynamics data or data specific to recognized other vehicles).

Example Conflict Zone and Conflict Scenario

Figure 6:
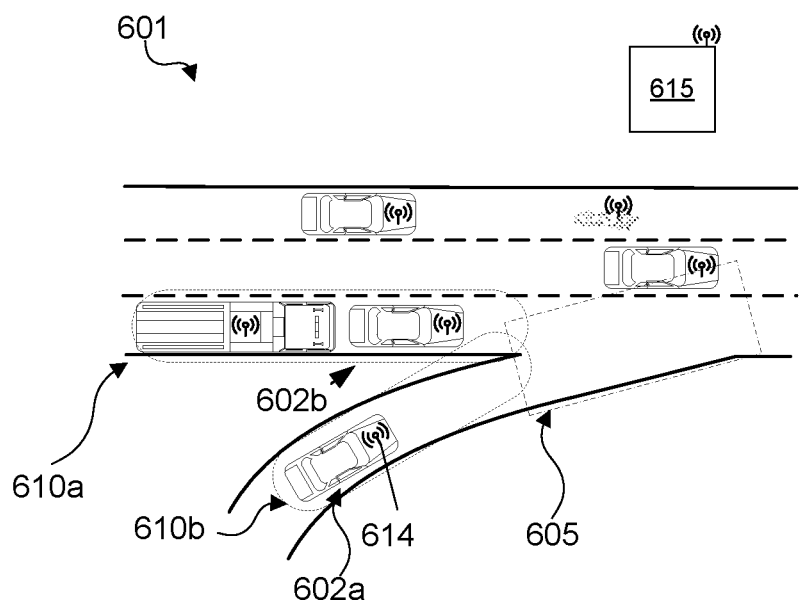
FIG. 6 shows a conventional connected vehicles for navigating a conflict zone.

As previously mentioned, there are many examples of conflict zones and/or conflict scenarios. As a particular non-limiting example for reference, FIG. 6 illustrates a conflict zone 605 that is a portion of a roadway for on-ramp merging (i.e. a merging zone). FIG. 6 illustrates an example connected vehicle navigation scenario 601 for connected vehicles 602 (e.g. 602a, 602b are shown) to navigate one example of a conflict zone 605, in this case, a portion of a roadway for on-ramp merging. Connected vehicle navigation scenario 601 can be one example conflict scenario.

In the FIG. 6 example as shown, conflict zone 605 can be a portion of a roadway in which a first lane merges with a second lane. As previously mentioned, in or near such conflict zones, vehicle response to other vehicle movements and/or to obstacles can be erratic and/or unpredictable. Prior systems appear to solve this unpredictability by requiring connected vehicles 602 to communicate with each other within one or more control zones 610 (including in this example, 610a and 610b) upstream of, or before of the conflict zone, for example, using vehicles' respective communication modules, one of which is referenced as 614. However, this can induce one or more costly communication delays, and may nevertheless still not result in successful navigation of the conflict zone. Connected vehicles 602 can communicate by vehicle-to-vehicle (V2V), vehicle-to-network (e.g. cloud connectivity) (V2N), and/or vehicle-to-infrastructure (V2I) communications, collectively, V2X communications. The connected vehicles 602 can communicate by way of one or more coordinator(s) 615 and/or communication modules 614. The coordinator 615 can communicate with the one or more connected vehicles 602 within a connective communication range to the coordinator 615, and/or another communication relay (not shown). In prior art systems, connected vehicles 602 can communicate with each other for purposes of negotiating movement within (across, through) conflict zone 605. In prior art systems, connected vehicles 602 can communicate with each other for providing absolute position and/or velocity information to the other connected vehicles (e.g. connected vehicles 602a and 602b). However, as alluded to above, such prior art systems may not adequately allow for safe navigation of conflict zones, e.g., conflict zone 605, and a safety driver may be required to take over control of the ADAS.

In contrast, various embodiments disclosed herein are directed to vehicle navigation through conflict zones without relying on connective information, and/coordination among vehicles, which can be slow, impracticable (e.g. because it is not likely that all vehicles in a conflict scenario will have connective functionalities) and/or unreliable.

Figure 7A:
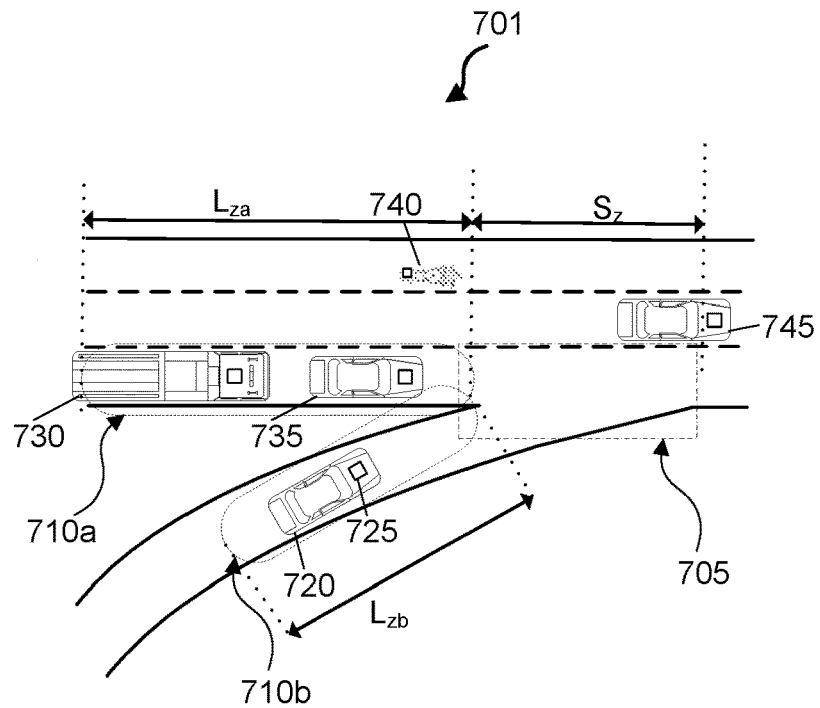
FIG. 7A shows an on-ramp merging example of a conflict zone that can be navigated by solving multi-vehicle merging and/or synchronization control problem(s).

As previously discussed, one or more vehicle elements as described with reference to FIGS. 1-5 (e.g. ADAS 225 and/or ADAS 325) can be used to effectively navigate one or more conflict zones. Although there can be many types of conflict zones, embodiments of the present disclosure will be discussed with reference to non-limiting example conflict zones and/or conflict zone scenarios. For example, FIG. 7A shows vehicles navigating a non-limiting example conflict zone scenario 701. In this conflict zone scenario 701, ego vehicle 720, and other vehicles 730, 735, 740, and 745 are attempting to navigate conflict zone 705, which can be the same conflict zone 605 as that illustrated in FIG. 6, i.e. a merging zone. Again, conflict zone 705 can be a merging region where two or more lanes merge into a single lane. However, unlike connected vehicles 602 shown in FIG. 6, embodiments of vehicles of the present disclosure, for example, vehicles (e.g. ego vehicle 720, and/or other vehicles 735, 740, 745) as shown here in FIG. 7A (and FIG. 7B as will be explained below) need not necessarily be connected vehicles.

In the specific FIG. 7A example, ego vehicle 720 can be traveling in a first lane which merges into a second lane, i.e., a conflict lane. Although the ego vehicle 720 is shown approaching the conflict zone 705 from a lane merging into another lane, it is understood the ego vehicle 720 can be in another lane (i.e. other than the lane that merges into another lane). Ego vehicle 720, and/or any other vehicles in the merging scenario need not be connected to other vehicles, infrastructure, and/or to a coordinator (e.g. coordinator 615 shown in FIG. 6) during, before, or after traversal of one or more conflict zone 705 of conflict zone scenario 701, or otherwise. In embodiments, the lack of reliance on connective information can allow for a smoother and/or more effective independent navigation of conflict zone 705.

In one or more embodiments, ego vehicle 720 (and/or other vehicles, e.g. vehicle 730, 735, etc.) can include an ADAS 725 for controlling or assisting in the control of ego vehicle 720 so that ego vehicle 720 may safely navigate conflict scenarios, such as conflict scenario 701. As used herein, ADAS can include one or more autonomous control systems. ADAS 725 can be a real-time machine perception system. In embodiments, ADAS 725 can be configured as one or more vehicle elements shown in FIG. 1, ADAS 225 shown in FIG. 2, and/or ADAS 325 shown in FIG. 3, to allow for navigation of conflict zone(s). ADAS 725, and/or self-driving vehicles can control/assume control of a vehicle. As previously discussed, ADAS 725 can provide navigation control signals for the vehicle to navigate a variety of situations. Knowledge of ego vehicle's 720 (i.e. the vehicle 720 having the ADAS 725) relative position (relative to an obstacle and/or another vehicle) and/or absolute position can be important information for ADAS. Knowledge of other vehicle's (e.g. vehicle 730, 735, etc.) position (relative and/or absolute) and relative movements to each other and/or to the ego-vehicle 720 is also important.

As previously discussed, the ADAS 725 can be coupled to and/or include one or more sensors. ADAS 725 can include one or more environment monitoring sensors, which can be optical (multi-spectral and/or hyperspectral, visible range, and/or IR or near-IR), RF, ultrasonic, and/or other sensors. ADAS 725 can include one or more pointing, navigation, and/or timing systems, such as GPS. ADAS 725 can include one or more sensors such as sensors 120 discussed with reference to FIG. 1. ADAS 725 can recognize at least a portion of the surrounding environment (such as size, color, types of objects in that environment). Moreover, ADAS 725 can recognize arrangements of objects in the surrounding environment (such as vehicles in a conflict scenario where, e.g., multiple vehicles are attempting to merge). Further still, ADAS 725 can recognize movements and/or arrangements of objects in the surrounding environment, which can include the area at or near conflict zone 705. Such movements and/or arrangements can include paths, speeds, trajectories, positions, steering angles, heading, accelerations of objects—relative to other objects but also absolute. As used herein, and as will be explained further, recognition of objects and/or predictions regarding object movement/trajectory can be based on: i) receiving inputs on own vehicle state and surrounding environment from one or more sensors, ii) on recalling information from one or more data store, iii) making one or more observations, including a time series of observations, and/or iv) solving or performing one or more of a frame comparison, feedback control problem, triangulation problem, inference problem, classification problem, multi-vehicle synchronization or other control problem. For example, recognition can be of one or more, two or more, three or more, etc. obstacles, such as other vehicles and/or stationary objects in the field of view of the sensors.

For example, one or more sensors mounted on ego vehicle 720 can have vehicles 730, 735, 740, and 745 in their field of view. The addition of sensors, including at different sides of the vehicle 720, and/or the addition of movable sensors (e.g. by gimballing) can allow for increased field of view and/or field of regard.

As previously discussed, ADAS 725 can facilitate one or more recognition tasks. The ADAS 725 can recognize the relative size, shape, and/or type of vehicle (e.g. of other vehicle 730, 735 etc.) The ADAS 725 can recognize that the ego vehicle 720 is approaching the conflict zone 705 (and/or other vehicles 730, 735, etc. are approaching a conflict zone). The ADAS 725 can recognize the type of conflict zone 705 and/or conflict scenario 701 (e.g. the ADAS can distinguish between merging on-ramp and/or a roundabout). The ADAS 725 can recognize that lane the ego vehicle 720 is following will merge into another lane. The ADAS 725 can recognize the type of conflict scenario (or combination of conflict scenario) and assign one or more identity to that conflict scenario. For example, merging lane scenario may have a different identity than roundabout, and each can have different identity than a speed reduction zone. The ADAS 725 can recognize a length $L_z$ ($L_{za}$ and $L_{zb}$ shown) of a control zone (e.g. 710a, 710b is shown) and/or a length $S_z$ of a conflict zone 705. If the corresponding road segment is curved, the length $L_z$, $S_z$ can be a path length, arc length, and/or chord length. For control zone 710a, 710b and conflict zone 705 in this scenario 701 shown in FIG. 7A compared to that (i.e. control zone 610) shown in FIG. 6, it is not necessary that the vehicle be in communication with other vehicles in or around the control zone 710 (e.g. control zone 710a, 710b) and/or conflict zone 705. As used here, the control zone is an area upstream of the conflict zone, within which vehicles can be observed where connectivity and/or vehicle coordination is not necessary for the vehicles to traverse the conflict zone 705. ADAS 725 can be adapted to take control over the ego vehicle 720 (i.e. from a driver) if the vehicle enters and/or approaches one or more control zone 710, conflict zone 705, and/or when conflict scenario 701 is recognized. In other embodiments, ADAS 725 can be adapted to take control over the ego vehicle 720 (i.e. from a driver) if the vehicle is determined to be driven erratically (e.g. swerving), and/or if a vehicle constraint, such as safe following distance, is violated. This can allow for a seamless and/or safe transition from driver to ADAS control.

The ADAS 725 can have one or more input sensors, memory, processor, and/or signal generators. For example, ADAS 725 can have one or more sensors 120 as shown in FIG. 1, optical sensor 205 as shown in FIG. 2, light perception device 305 as shown in FIG. 3. LiDAR can be used for velocity, position, and/or distance sensing. Technologies described herein can be used in combination with GPS (global positioning systems) and/or inertial navigation systems (INU). For example, GPS can be used to determine an absolute position of the LiDAR sensor and/or the vehicle. The ADAS 725 can further recognize the position, speed, and/or the acceleration/deceleration of other obstacles and/or other vehicles. The ADAS 725 can determine a relative position, speed, and/or acceleration/deceleration of each vehicle to ego vehicle 720. Based on at least one of an absolute and/or relative position, speed, and/or acceleration/ deceleration of the ego vehicle 720 the ADAS 725 can determine a vehicle state, position, speed, and/or acceleration/deceleration (e.g. control inputs corresponding to vehicle actuation, such as actuation signals) of the other vehicles. These can be determined by the ADAS' 725 knowledge of one or more vehicle states of the ego vehicle 720, vehicle parameters such as size, dimensions, and/or positions of the one or more sensors relative to a geometric center of the ego vehicle 720, control inputs to actuation systems of the ego vehicle 720, GPS, and/or comparison to relative position, speed, acceleration relative to one or more stationary objects in the field of view such as trees or lane dividers. ADAS 725 can be adapted for modeling and/or computing one or more vehicle dynamics models based on recognition of a conflict zone scenario, and/or a recognition of vehicles states, timing, etc. of other vehicles and/or for ego vehicle 720. One or more vehicle modeling data (i.e. modeling data as previously discussed) can be stored in the ADAS 725. For example, vehicle modeling data can include the Weidemann human driver model as previously mentioned. The ADAS 725 can determine $L_z$ ($L_{za}$, $L_{zb}$ shown), a length of the control zone 710*a*, 701*b*, prior to (i.e. upstream of) the conflict zone 705, and $S_z$, a length of the conflict zone 705 (measured in a direction of vehicle (e.g. of ego vehicle 720 or other vehicle) travel across the or conflict zone 705). These lengths can be determined, for example, by support from one or more ADAS 725 calibration.

The ADAS 725 can perform one or more control problems and/or optimization problems, for example, as discussed with reference to steps 402 and/or step 405 of method 400 of FIG. 4A, and/or steps 454 and/or step 455 of method 450 of FIG. 4B. The control problem and/or optimization problem can be a multi-vehicle merging and/or multi-vehicle synchronization problem. The control problem can be a non-linear control problem. Predicted vehicle states (e.g. position, speed, acceleration, and/or entry/exit times) can be modified based on observations, and/or the calculations used to generate predictions can be modified based on comparisons of predictions to observations.

Vehicle Dynamics Control Problem for Conflict Zones

ADAS 725 can determine the vehicle dynamics for the one or more other vehicles (e.g. vehicles 730, 735), and/or for the ego vehicle 720. Non-limiting examples of determining such vehicle dynamics and/or solving such vehicle dynamics control problem will be discussed.

The vehicle dynamics can comprise a predicted and/or modeled trajectory for each vehicle. The vehicle dynamics for each vehicle can be modeled as a state equation for each vehicle. The vehicle dynamics can be determined in multiple ways, however, details on non-limiting examples of how to determine vehicle dynamics and/or will be described in detail. The vehicle dynamics can be used to solve a control problem as described herein. The control problem can include multi-vehicle merging or multi-vehicle synchronization problem as described herein (e.g. with reference to step 402 of FIG. 4A, step 452 of FIG. 4B). As previously discussed, the control problem can be a non-linear control problem. As previously discussed, the control problem can be solved as a deep learning algorithm, and weights of a deep learning algorithm (such as an MPC algorithm as mapped to a quadratic problem operating on CT-RNN as previously discussed with reference to FIGS. 3-5), can be determined and/or adjusted based on solving the multi-vehicle merging or multi-vehicle synchronization problem.

The ADAS 725 can analyze one or more arrangements (e.g. queues) of vehicles in a field of view of the one or more sensors of the vehicle. The arrangement or queue of vehicles can include vehicles in the same lane as ego vehicle 720 but also in other lanes. The queue of vehicles can include vehicles determined by the ADAS 725 as being likely to cross the conflict zone 705. The queue of vehicles can exclude vehicles determined by the ADAS 725 to not be likely to cross through the conflict zone 705. For example, vehicles can be determined to be in a conflict lane and have blinkers indicating a change of lane and that begin a motion out of the conflict lane. As another example, vehicle(s) can be one or more, two or more, three or more lanes remote from the conflict zone 705 (see for example vehicle 740), and/or can be determined to have a speed and/or trajectory not allowing for merging into conflict zone 705. Yet still, ADAS 725 can determine vehicles can have vehicle dynamics (e.g. vehicle states) which make that vehicle less than likely to enter conflict zone 705. See for example vehicle 745, which can be determined to not enter the conflict zone 705 based on determined (e.g. by ADAS 725 of ego vehicle 720) vehicle steering and/or acceleration control parameters.

ADAS 725 can determine the vehicle dynamics for the one or more other vehicles (e.g. vehicles 730, 735), and/or for the ego vehicle 720 by breaking the scenario 701 into individuals sub scenarios, such as individual vehicles with individual vehicle trajectories. These can be initially modeled as vehicle states, and updated according to the one or more models, vehicle dynamics, and/or control problem herein. The vehicle dynamics and/or control problem, can be determined with respect to each vehicle (e.g. ego vehicle 720 paired with each other vehicle in the vehicle scenario 701). The ONN (e.g. ONN 370 of FIG. 3 and/or processor 220 of FIG. 2 which can be an optical processor) can allow for solving these control problems and/or vehicle dynamics expeditiously (e.g. with parallel processing). For example, one or more nodes/neurons of ONN 370 can be dedicated to solving (e.g. one or more vehicle dynamics and/or problems) with respect to one vehicle pair, while one or more nodes/neurons of ONN 370 can be dedicated to solving with respect to another vehicle pair. ONN also allows for reprogramming (and/or re-training) the ONN on the fly depending on the number of vehicles, conflict scenario, and/or conflict zone.

When ADAS 725 recognizes one or more other vehicles, and/or the conflict scenario 701 which can include other vehicles, ADAS 725 can assign a unique identity i for that other vehicle and the ego vehicle 720.

The ADAS 725 can determine a time when vehicle i enters a control zone 710 leading into a conflict zone 705. Such a time can be, $t_i^{o,z}$. The ADAS 725 can determine a time when the vehicle enters the conflict zone 705 of conflict scenario z, which can be referred to as $t_i^{m,z}$. The time the vehicle exits the corresponding control zone 710 can be $t_i^{f,z}$. ADAS 725 can store one or more of such time, e.g. $t_i^{o,z}$. A time mentioned herein can be a predicted, modeled, and/or actual time. In embodiments, the predicted or modeled time is updated by an actual time, and one or more predicted or modeled times can be adjusted based on difference between the actual time value and the predicted value. Thus, generally, the observations of one or more vehicles (e.g. ego vehicle 720, vehicle 730, etc.) within or near one or more control zones 710, can influence one or more predictions and/or models for the vehicles in the corresponding conflict zone 705.

As previously discussed, when ADAS 725 recognizes one or more conflict scenario (e.g. conflict scenario 701), ADAS can assigned an identity z to the conflict scenario z. As shown herein, the conflict scenario 701 can be conflict scenario z. $\mathcal{N}_z(t)$ can correspond to a queue of vehicles to be analyzed by ADAS 725 for conflict scenario z. In some embodiments, for the queue of vehicles $\mathcal{N}_z(t)$, $\mathcal{N}_z(t)=\{1, \ldots, N(t)\}$, where $t \in \mathbb{R}^+$ is the time (with a real, positive value). Here, N(t) can be the total number of vehicles within the control zone of the conflict scenario z at time $t \in \mathbb{R}^+$. The dynamics of each vehicle i, $i \in \mathcal{N}_z(t)$, can be represented with a state equation $\dot{x}(t)=f(t, x_i, u_i)$, $x_i(t_i^{0,z})=x_i^{0,z}$ where $x_i(t), u_i(t)$ are respectively the state and control input of the vehicle i.

The vehicle i can enter conflict zone 705 of conflict scenario z at the initial time $t_i^{0,z}$. The initial vehicle state for each vehicle corresponding to the initial time $t_i^{0,z}$, can be $x_i(t_i^{0,z})=x_i^{0,z}$. Based on vehicle dynamic modeled behavior, and/or relative position and/or trajectory compared to conflict zone 705, in one or more embodiments, a vehicle can be determined to not likely enter conflict zone 705 (e.g. at a 50%-100% confidence level). If the vehicle is determined to be not likely to enter conflict zone 705, set $\mathcal{N}_z(t)$ can optionally be modified to exclude that vehicle. ADAS 725 can model each vehicle as a double integrator. For example, $\dot{p}_i=v_i(t)$ and $\dot{v}_i=u_i(t)$, where $p_i \in \mathcal{P}_i$ denotes the position, $v_i \in \mathcal{V}_i$ denotes the speed, and $u_i \in \mathcal{U}_i$ denotes the acceleration/deceleration (control input) of each vehicle i.

As previously discussed, vehicle dynamics can be modeled as one or more vehicle state equation. For example, the state of each vehicle i can be denoted as $x_i(t)=[p_i(t)v_i(t)]^T$. For example, for initial value $t_i^{0,z}$, the state of each vehicle i can be $x_i(t_i^{0,z})=[p_i(t_i^{0,z})v_i(t_i^{0,z})]^T$ taking values in the state space $X_i = \mathcal{P}_i \times \mathcal{V}_i$. The sets $\mathcal{P}_i$, $\mathcal{V}_i$, and $\mathcal{U}_i$, $i \in \mathcal{N}_z(t)$ can be complete and totally bounded subsets of $\mathbb{R}$. The state space $X_i$ for each vehicle i can be closed with respect to the induced topology on $\mathcal{P}_i \times \mathcal{V}_i$ and thus, it can be compact.

As previously discussed, a control problem can be determined for each vehicle and/or vehicle pair. The following can be a control problem for each vehicle in the queue $\mathcal{N}_z(t)$:

$$\min_{u_i} \frac{1}{2} \int_{t_i^{0,z}}^{t_i^{m,z}} u_i^2(t) dt, \forall i \in \mathcal{N}_Z(t).$$

In embodiments, the control problem holds for all or for any conflict zone scenario z, subject to at least one constraint for given values for $t_i^{0,z}$, $t_i^{m,z}$. For example, in embodiments, the control problem holds subject to at least one vehicle dynamics constraint. Example vehicle dynamics constraints will be discussed below. In embodiments the control problem is a minimization problem. In embodiments, the control problem is an upper-level vehicle coordination problem (i.e. multi-vehicle merging and/or synchronization problem).

In one or more embodiments, control problem can be solved recursively (e.g. in time steps, but also recursively among vehicles). Because of the recursive nature of such a problem, and the optical data from surrounding environment, such problem can be efficiently solved by deep learning algorithm (e.g. CT-RNN) operating on an ONN (e.g. ONN 370) as discussed herein. Further, such a problem can be solved by tailored ONN 370, having weights and/or bias (e.g. relative connection strengths between nodes/neurons) determined and/or adjusted based on the conflict scenario and/or conflict zone. For example, in one or more embodiments, solving multi-vehicle merging or multi-vehicle synchronization problem can include solving the above control problem for other vehicles in the surrounding environment before solving for ego vehicle, in view of relevant constraints, which will be elaborated further below.

Constraints on the Control Problem

As previously discussed, one or more control problem as solved herein can be solved in relation to one or more constraints imposed on the control problem. Constraint(s) (or constraint problem(s) as used herein) can restrain or constraint the control problem. The recursive nature of solving the control problem(s) in view of one or more constraints, can make the ONN, (e.g. which can be at least partially configured as a CT-RNN) optimal (e.g. efficient) for solving such problems (i.e. selection and/or prediction of time(s) for vehicle i to enter conflict zone 705 of conflict scenario z so as to avoid one or more safety constraints).

Vehicle dynamics constraints can constraint a model (e.g. vehicle state) for the one or more vehicles (e.g. ego vehicle 720, and/or other vehicles such as vehicle 730, and/or vehicle 735) in the conflict scenario 710. These can include constraints on control input and/or vehicle speed. Constraints on the dynamics of the vehicle can be modeled by state equation $\dot{x}(t)=f(t, x_i, u_i)$, $x_i(t_i^{0,z})=x_i^{0,z}$ where $x_i(t), u_i(t)$ are respectively the state and control input of the vehicle i. Further, vehicle dynamics constraints can include constraints on acceleration/deceleration. For example, $u_{min}$, $u_{max}$ can constrain the minimum deceleration and maximum acceleration respectively. Further, $v_{min}$, $v_{max}$ can constrain the minimum and maximum speed respectively.

In embodiments, to ensure that the control input and vehicle speed are determined within an admissible range, the following control input (acceleration and/or deceleration) and speed constraints can be imposed:

$$u_{min} \leq u_i(t) \leq u_{max}, \text{ and}$$

$$0 \leq v_{min} \leq v_i(t) \leq v_{max} \in \forall t \in [(t_i^{0,z}), (t_i^{f,z})],$$ where $u_{min}$, $u_{max}$ can be the minimum deceleration and maximum acceleration respectively, and where $v_{min}$, $v_{max}$ can be respectively be the minimum and maximum speed.

Vehicle dynamics constraints can include constraints on vehicle position. For example, control problem can be subject to:

$$p_i(t_i^{0,z})=p_i^{0,z},$$

$$v_i(t_i^{0,z})=v_i^{0,z}, \text{ and/or}$$

$$p_i(t_i^{m/z})=p_z.$$

In embodiments, $p_z$ can be the location (entry position) at the conflict zone 705. In embodiments, $p_i^{0,z}$, $v_i^{0,z}$ can be the initial position and speed of vehicle i when it enters the control zone (e.g. control zone 710a, 710b) of the conflict scenario z. The entry location of the conflict zone 705 can depend on the vehicle dynamics and/or relative position of the vehicle to the conflict zone. The control problem can be a non-linear control problem. For example, a vehicle on a lane which merges into another lane at a conflict zone 705 can enter the conflict zone 705 where that lane enters the merging zone. For example, a vehicle to a side of the conflict zone 705 can enter the conflict zone 705 from a side.

The constraints can be learned, and/or determined depending on the type of road, vehicle conflict zone, and/or determined conflict scenario z (e.g. conflict scenario 701). The constraints can be tailored around actual vehicle dynamics, such as breaking (deceleration) response, maximum speed for a type of vehicle, acceleration response, and/or steering angle. The constraints can differ depending on a recognized vehicle and/or vehicle type. For example, the ADAS 725 system can recognize a vehicle type (for example by recognizing a vehicle type, size, dimension, a vehicle id, wheel size, etc., and comparing to a database or determining by calculation) and determine a maximum and/or minimum acceleration and/or deceleration value for that type of vehicle i. For example a bicycle can have different maximum and/or minimum acceleration and/or deceleration, and/or maximum and/or minimum speed values compared to a motorcycle, bus, pedestrian, truck, and/or a sport utility vehicle. Further, one or more maximum and/or minimum steering angles, heading, turning angle, or other heading or steering control input can depend on the type and/or identity of the vehicle, but also one or more speed and/or acceleration of the vehicle. For example, angle of a steering control input, and/or information on how rapidly the steering wheel is being turned, can be determined. There can be a vehicle dynamics constraint corresponding to turning the wheel at a fast rate while driving at highway speeds. Depending on the type and/or identity of the corresponding vehicle, violation of such a steering constrained can be interpreted (e.g. by ADAS 725) as an indication that the vehicle is out of control. Moreover, the constraints can depend on one or more infrastructure and/or surrounding environment information, such as presence of one or more passing lanes and/or safety lanes, a speed limit for a road segment, and/or location of a traffic signal, etc.

As previously mentioned, one or more safety related constraints can be imposed on the control problem. For example, the control problem can be subject to a read-end safety constraint and/or lateral collision constraint. In conflict zones, two or more of vehicles and/or obstacles can come within some distance therebetween that might necessitate implementation of some designated safe following distance relative to each other. A safe following distance can be influenced by various factors, including but not necessarily limited to the speed of the first vehicle and/or second (e.g., preceding or following) vehicle, typical driver (human or assisted/machine) reaction time and/or a distance that can be traveled by a vehicle during that reaction time. Safe following distance can be the distance traveled in 0.1 s, 0.2 s, 0.5 s, 1 s, 1.5 s, 2 s, 2.5 s, etc. The presence of rain, sleet, ice, humidity, etc. on the vehicle driving surface, or other general environmental factors, and/or other factors which affect stopping distance and/or reaction times (such as fog, distractive obstacles in the surrounding environment, etc.) can influence the safe following distance and/or conflict zone size. To avoid the rear-end collision of two consecutive vehicles traveling on the same lane, the position of the preceding vehicle can be modeled to be greater than, or equal to the position of the following vehicle plus a predefined safe following distance or safe distance $\delta_i(t)$. $\delta_i(t)$ can be proportional to a safe following time, a reaction time, the speed of the vehicle i, $v_i(t)$, and/or be dependent on at least one of a determined weather, road, environment, and/or distraction condition, etc.

In embodiments, the ADAS 725 can determine a rear-end safety constraint:

$s_i(t)=p_k(t)-p_i(t)\geq\delta_i(t)$, $\forall t\in[(t_i^{o,z}),(t_i^{f,z})]$, where vehicle k is ahead of vehicle i in a queue of vehicles, for example, in the same lane. The activation (i.e. violation) of rear-end safety constraint (i.e. a rear-end collision or near rear-end collision) can be avoided under selection of initial conditions $[t_i^{o,z}, v_i t_i^{o,z}]$. As previously discussed, the ADAS 725 can determine the times that every other vehicle will cross the control zone 710 and/or conflict zone 705 based on observation and/or calculation. The ADAS 725 can determine an available or optimal time (e.g. a time slot). An available time can be a time other than the times the other vehicles are determined to cross, enter, or be within the conflict zone 705. The ADAS 725 can determine an available or optimal time for ego vehicle 720 (or other vehicle) to cross the conflict zone 710, as well as an initial speed and/or acceleration for crossing the conflict zone. The available time slot can be determined based on (i.e. for the purpose of) at least one of: collision avoidance, to adjust a relative velocity between ego vehicle 720 and another vehicle (i.e. speed matching), respecting a trajectory of another vehicle, and/or other trajectory planning.

In embodiments, two sets $\mathcal{L}_i^z(t)$ and $\mathcal{C}_i^z(t)$ can contain the preceding vehicle traveling in the same lane (i.e. in set $\mathcal{L}_i^z(t)$), or in the conflict lane (i.e. in set $\mathcal{C}_i^z(t)$) relative to vehicle i, respectively. For example, according to FIG. 7A, vehicle 735 can be in a conflict lane relative to ego vehicle 720. Thus if, for example, ego vehicle 720 corresponds to vehicle i, vehicle 735 can correspond to vehicle (i–1), wherein vehicle $(i-1)\in\mathcal{C}_i^z(t)$.

In general, solving one or more vehicle dynamics control problem, multi-vehicle synchronization and/or merging problem, can include determining one or more vehicle dynamics parameters for ego vehicle to enter and/or cross conflict zone 705. The determination for one or more vehicle dynamics parameters can depend on the salient characteristics of the conflict scenario 700, and examples mentioned herein are merely exemplary. Vehicle dynamics parameters can include an available optimal time for ego vehicle 720 to enter and/or cross conflict zone 705, an optimal initial (and/or intermediate and/or final) speed, control input, and/or acceleration and/or deceleration, an optimal starting position (or other trajectory through conflict zone 705) etc.

Example vehicle dynamics parameter, as previously mentioned can include the time $t_i^{m,z}$ that the vehicle i should and/or will enter the conflict zone 705. The time can be a feasible, available, or optimal time. The ADAS 725 can determine the time $t_i^{m,z}$ that the vehicle i will and/or should enter the conflict zone 705 for each conflict scenario z upon observation and/or identification of the vehicle i (and/or or another vehicle). For any time mentioned herein, the ADAS 725 can observe an actual entry time for that vehicle i and adjust one or more modeling parameters on the system based on a comparison of predicted or determined entry time and the actual entry time.

The ego vehicle 720 (e.g. by ADAS 725), upon arrival at the entry of the control zone (e.g. control zone 710b), the entry of the conflict zone, and/or upon recognition or determination of the upcoming conflict zone 705 and/or conflict scenario z, can search for feasible times to enter and/or cross the conflict zone 705 (and other feasible dynamics parameters) based on available time slots. Such a search can be performed recursively or in parallel (i.e. for each vehicle or vehicle pair). The recursion can be initialized when a vehicle is determined to enter into the control zone (i.e. an area upstream of the conflict zone 705, such control zone 710a or 710b). the recursion can be initialized when a vehicle is recognized and/or assigned an identity by the ego vehicle 720 ADAS 725. For example, the recursion can be initialized when the ego vehicle 720 is determined to enter a control zone (e.g. control zone 710b), or when ego vehicle 720 and/or ADAS 725 assigns an identity to ego vehicle 720 or another vehicle. The recursion can be initialized when the conflict scenario 700 is initialized and/or assigned an identity, e.g. conflict scenario z. The recursion can successively be performed with updated data, such as updated navigation data for the vehicles based on subsequent observations.

Therefore, the ego vehicle 720 (which can assign to itself an identity vehicle i) can recursively use one or more observed, modeled, predicted, and/or actual navigation or other data regarding one or more previous vehicles (e.g. vehicle i−1 or i−2) in a queue, and/or of other vehicles (e.g. vehicle i+1 or i+2). Such navigation or other data can be useful in assessing feasible available, or optimal times to enter the conflict zone 705 (and other dynamics parameters for entering and otherwise navigating the conflict zone 705).

The ego vehicle 720 can calculate and/or otherwise determine one or more optimal times to enter the conflict zone 705. As previously discussed, the optimal times can be such that one or more trajectories are respected, one or more relative velocities are maintained (e.g. speed-matching), and/or collisions are avoided. As previously discussed, the ego vehicle 720 can determine an optimal time with respect to each other vehicle. The optimal time can depend on if the other vehicle is determined to approach the conflict zone 705 from the same lane as the ego vehicle 720, or another lane (i.e. a conflict lane). Thus, the optimal time can depend on if another vehicle i−1∈$\mathcal{L}_i^z(t)$ or if another vehicle i−1∈$\mathcal{C}_i^z(t)$. For example, the optimal time can depend on the length of the control zone (e.g. length of control zone 710a, $L_{za}$, and/or length of control zone 710b, $L_{zb}$), and/or the length of the conflict zone (e.g. length of conflict zone 705 shown as $L_z$). The optimal time can depend on the time the one or more other vehicle is determined to or has actually entered the conflict zone 705, and/or has exited the control zone (e.g. control zone 710a, 710b). The optimal time can depend on one or more constraints on the control input (acceleration and/or deceleration), and/or speed constraints for the ego vehicle 720, or as determined for one or more other vehicle. For example, ego vehicle 720 will not be able to arrive at control zone 705 at time faster than it takes vehicle 720 to traverse conflict lane 710, going at speed $v_{max}$, e.g.

$$\frac{L_z}{v_{max}}.$$

For each vehicle i∈ $\mathcal{N}_z(t)$, lateral collision is possible within the set:

$\Gamma_i \triangleq \{t | t \in [t_i^{m,z}, t_i^{f,z}]\}$. Lateral collision between any two vehicles i, j∈ $\mathcal{N}_z(t)$, can be avoided if the following lateral collision constraint holds: $\Gamma \cap \Gamma_j = \emptyset$, $\forall t \in [t_i^{m,z}, t_i^{f,z}]\}$, i, j∈ $\mathcal{N}_z(t)$.

Lateral collision constraint can be enforced by selecting appropriate merging time $t_i^{m,z}$ for each vehicle i by solving the upper-level vehicle coordination problem (i.e. multi-vehicle merging and/or synchronization problem.) The upper-level vehicle coordination problem can be determined recursively for one or more vehicle in the field of view, and/or of ego vehicle 720. The vehicle coordination problem can correspond to an acceleration profile, and/or vehicle trajectory and/or entry time at the conflict zone for each conflict scenario.

In the control problem, the cost function can be the $L^2$-norm of the control input (acceleration/deceleration), i.e. $\frac{1}{2}u^2(t)$, to minimize transient engine operation (thus benefiting fuel consumption). In one or more embodiments, the optimal control problem can be adjusted for the ego vehicle 720 to minimize stop and go driving (e.g. for a more smoother merging in a merging scenario), to minimize erratic driving (e.g. abrupt swerving), and/or match at least one of a speed or acceleration of another vehicle within the conflict zone. In one or more embodiments, the optimal control problem can be adjusted for the ego vehicle 720 to minimize the amount of time spent in the conflict zone, while still navigating in a safe manner. These equations (i.e. the control problem) can be applied recursively for each recognized vehicle. The recursion can be initialized when a vehicle is determined to enter into a control zone (i.e. an area upstream of the conflict zone), when the conflict scenario (e.g. conflict scenario 701) is recognized, and/or when a vehicle is recognized and/or assigned an identity by the ego vehicle 720 ADAS 725.

In one or more embodiments, after the conflict zone scenario is determined (e.g. conflict scenario 701), the vehicles and/or other information from the surrounding environment (such as the presence of obstacle(s), the traffic pattern and/or traffic sign) can be observed such that a putative leader for the conflict zone scenario is determined. For example, it may be determined that vehicles in a first lane should follow yielding behavior (and are thus not putative leaders but rather followers for the conflict zone scenario). In one or more embodiments, the ADAS 725 can allow for respecting a trajectory of putative leaders but not putative followers. In one or more embodiments, the ADAS can recognize if one or more vehicles exhibit erratic driving behaviors (an erratic vehicle), such as significant stop and go driving, and/or significant swerving, and/or if the vehicles are automatically or manual driver controlled. Erratic driving behaviors can also be determined based on behavior parameters such as changing lanes without signaling, speeding, and/or inattentiveness. One or more embodiments of the disclosure can adjust at least one of vehicle trajectory, safe following distance, relative velocity between the ego vehicle 720 and the erratic vehicle, to respect trajectories of such erratic vehicles. For example, $u_{min}$, $u_{max}$ can be different for erratic vehicles (compared to non-erratic vehicles), and/or safe distance $\delta_i(t)$ can be larger if the ego vehicle 720 is following manual driver controlled, or erratic vehicles in the conflict zone 705.

Figure 7B:
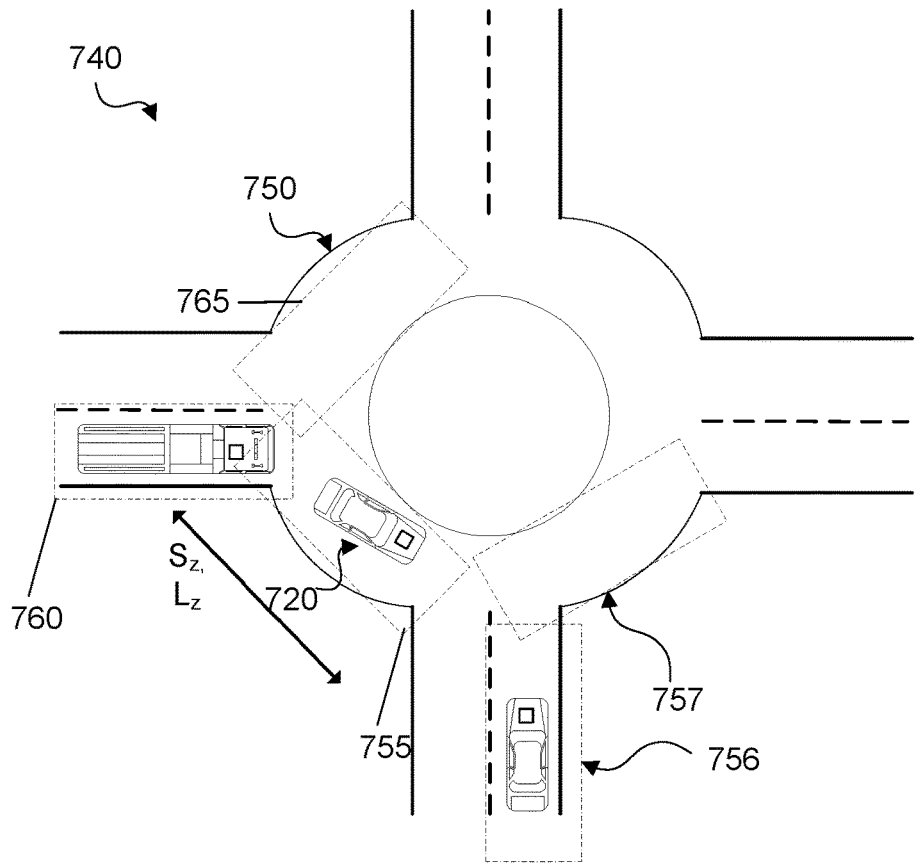
FIG. 7B shows a roundabout example of a conflict zone that can be navigated by solving multi-vehicle merging and/or synchronization control problem(s).

As another nonlimiting example of a type of conflict zone and/or conflict scenario, FIG. 7B shows an conflict zone scenario 740 at a roundabout 750, and ego vehicle 720 navigating roundabout 750. Example conflict zone 755 of roundabout 750 is shown. Although only a portion of the roundabout may be described here, it can be understood that all of the roundabout 750 can constitute a conflict zone. The ego vehicle 720 can be a vehicle as shown according to aspects described in accordance with FIG. 7A. Conflict zones and multi-vehicle merging and/or synchronization control problems for roundabouts can be solved similar to the conflict zones shown in merging scenarios of FIG. 7A. A merging conflict zone 755 in a roundabout may subsequently merge with another lane 756 of traffic and form another downstream merging zone or conflict zone 757. Thus, some pieces of road (see portion 755) may simultaneously be a control zone for a downstream merging conflict zone 757 zone, but also be its own merging zone or conflict zone 755. Thus $L_z$, a length (i.e. an arc length, path length, chord length) of the control zone prior to (upstream of) the merging zone or conflict zone 757, may be the same as $S_z$, the corresponding length of the merging zone 755 or conflict zone. The multi-vehicle synchronization and/or merging problem may be solved by recursively and/or continuously applying the methods and/or systems described in relation with FIG. 7A, and FIGS. 1-5.

As described herein, vehicles can be flying, submersible, boats, roadway, off-road, passenger, truck, trolley, train, drones, motorcycle, bicycle, or other vehicles. As used herein, vehicles can be any form of powered or unpowered transport. Obstacles can including one or more pedestrian, vehicle, animal, and/or other stationary or moving objects.

The term "operably connected," "coupled", or "coupled to", as used throughout this description, can include direct or indirect connections, including connections without direct physical contact, electrical connections, optical connections, and so on.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, or C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A real-time machine perception system for vehicle actuation of a first vehicle in a multi-vehicle environment, comprising:
   an optical sensor for receiving a reflected portion of light from one or more objects within a field of view, and generating an optical signal based on the reflected portion of light;
   an optical processing component coupled to the optical sensor, the optical processing component comprising:
     an optical neural network (ONN) configured to:
       detect the first vehicle is approaching a conflict zone;
       in response to detecting the first vehicle is approaching a conflict zone, determine weights for a deep learning algorithm by solving a non-linear control problem involving multi-vehicle merging or multi-vehicle synchronization for the first vehicle moving into the conflict zone; and
       apply the deep learning algorithm to the optical signal, the deep learning algorithm having the weights determined by solving the non-linear control problem to the optical signal; and
   an electronic actuation signal generation component coupled to the ONN configured to generate an electronic actuation signal for controlling an actuation system of the first vehicle;
   wherein when the reflected portion of light is at least partially reflected off an obstacle in the field of view, the electronic actuation signal corresponds to an actuation of the first vehicle for the purpose of at least one of: (i) adjusting a relative velocity between the first vehicle and the obstacle; or (ii) collision avoidance between the first vehicle and the obstacle.

2. The system of claim 1, wherein the obstacle is a second vehicle other than the first vehicle, and wherein solving a non-linear control problem comprises solving a multi-vehicle merging or multi-vehicle synchronization problem in the conflict zone comprising at least one of: (i) a speed reduction zone; (ii) a roundabout; or (iii) a merging on-ramp.

3. The system of claim 2, wherein the weights are determined by training and updated based on outcomes for the multi-vehicle merging or multi-vehicle synchronization problem.

4. The system of claim 3, wherein the optical neural network comprises a subset of optical neuron components dedicated to classifying a likelihood of successful outcomes for the multi-vehicle merging or multi-vehicle synchronization problem.

5. The system of claim 2, wherein the non-linear control problem further comprises a model predictive control algorithm based on a vehicle state for the first vehicle and a state of the second vehicle.

6. The system of claim 5, wherein the ONN implements a recurrent neural network for solving quadratic programming problem by using the optical components; wherein the recurrent neural network is implemented by:
   mapping the model predictive control algorithm to a quadratic programming problem; and
   solving the quadratic programming problem with the recurrent neural network.

7. The system of claim 2, wherein the system requires no cloud, first-vehicle to second vehicle, or network connectivity to generate the electronic actuation signal.

8. The system of claim 1, wherein the actuation signal corresponds to at least one of a velocity rate of change, a direction, or a trajectory for the first vehicle.

9. The system of claim 1, wherein the sensor signal comprises an optical signal corresponding to at least one of: (i) a first vehicle velocity; (ii) a first vehicle trajectory; (iii) an obstacle position; (iv) an obstacle velocity; or (v) an obstacle trajectory.

10. The system of claim 1, wherein the weights are determined by solving the non-linear control problem based on:
    a queue of vehicles detected to be approaching the conflict zone, inclusive of the first vehicle;
    a conflict scenario for the conflict zone selected from a speed reduction zone, roundabout, or merging on-ramp;
    a control input for the actuator of the first vehicle;
    a time when each vehicle of the queue of vehicles enters a control zone prior to conflict zone;
    a time when each vehicle of the queue of vehicles enters the conflict zone; and
    wherein the non-linear control problem holds for a duration of the first vehicle navigating the conflict zone, subject to at least one constraint selected from a group consisting of: (i) a vehicle dynamics constraint; (ii) a rear end safety constraint; and (iii) a lateral collision constraint.

11. A mobile vehicle for navigating in a multi-vehicle environment, comprising:
    a light detection and ranging (LiDAR) sensor mounted on the vehicle and configured to generate an optical signal based on a perceive light from a LIDAR sensor field-of-view;
    an optical neural network (ONN) comprising optical processing components, the ONN coupled to the LiDAR sensor and configured to:
      detect the mobile vehicle is approaching a conflict zone,
      in response to detecting the mobile vehicle is approaching a conflict zone, determine weights for a deep learning algorithm by solving a non-linear control problem associated with the mobile vehicle moving into a conflict zone, and
      perform optical processing on the optical signal according to the deep learning algorithm having the weights determined by solving the non-linear control problem; and an automated vehicle actuation component configured to control an actuator of the mobile vehicle, wherein the automated vehicle actuation component is coupled to the ONN and configured to generate an electronic actuation signal corresponding to a motion produced by the actuator for actuation of the mobile vehicle into the conflict zone while avoiding collisions.

12. The mobile vehicle of claim 11, wherein the conflict zone comprises at least one of a speed reduction zone, a roundabout, or a merging on-ramp.

13. The mobile vehicle of claim 11, wherein the weights are determined by solving the non-linear control problem $$\min_{u_i} \frac{1}{2} \int_{t_i^{o,z}}^{t_i^{m,z}} u_i^2(t)dt,$$

$\forall i \in N_z(t)$;
wherein:
N$_z$(t) corresponds to a queue of vehicles detected to be approaching the conflict zone, inclusive of the mobile vehicle;
1 denotes a vehicle of the multi-vehicle environment;
z denotes a conflict scenario z selected from the speed reduction zone, roundabout, or merging on-ramp;
u$_i$(t) denotes a control input for the actuator of the vehicle;
time $t_i^{o,z}$ is the time when vehicle i enters a control zone prior to the conflict zone; and
time $t_i^{m,z}$ is the time the vehicle enters the conflict zone; and
wherein the non-linear control problem holds for a duration of mobile vehicle navigating the conflict zone, subject to at least one constraint for given $t_i^{o,z}$, $t_i^{m,z}$; wherein the at least one constraint is selected from a group consisting of: (i) a vehicle dynamics constraint; (ii) a rear end safety constraint; and (iii) a lateral collision constraint.

14. The mobile vehicle of claim 11, wherein when the light perceived at the LiDAR sensor includes light reflected from two other vehicles other than the mobile vehicle, and the electronic actuation signal corresponds to a velocity rate of change for the mobile vehicle and a steering angle or heading such that the mobile vehicle respects a trajectory of one of the two other vehicles while the mobile vehicle moves into the conflict zone.

15. The mobile vehicle of claim 11, wherein the mobile vehicle does not require vehicle-to-vehicle, vehicle-to-infrastructure, and vehicle-to-network connectivity for actuation of the mobile vehicle into the conflict zone while avoiding collisions.

16. The mobile vehicle of claim 11, wherein responsive to detecting the approach into the conflict zone, the ONN receives a command to solve the non-linear control problem associated with the mobile vehicle moving into the conflict zone to determine the deep learning algorithm weights.

17. The mobile vehicle of claim 11, wherein the non-linear control problem comprises a model predictive control problem based on a vehicle state for the mobile vehicle and a vehicle state of one other vehicle within the conflict zone; wherein the model predictive control problem models the mobile vehicle's approach into the conflict zone in view of a determined trajectory of the one other vehicle; and wherein the electronic actuation signal corresponds to a velocity rate of change and a steering angle or heading for the mobile vehicle such that the mobile vehicle respects the trajectory of the other vehicle.

18. The mobile vehicle of claim 17, wherein the ONN implements a recurrent ONN for solving quadratic programming problem by using the optical components; wherein the recurrent ONN is implemented by:
mapping the model predictive control problem to a quadratic programming problem; and
solving the quadratic programming problem with the recurrent ONN.

19. The mobile vehicle of claim 18, wherein a first population of neurons in the ONN are dedicated to predicting the acceleration and trajectory of the mobile vehicle, and a second population of neurons in the ONN are dedicated to predicting if the trajectory of the other vehicle within the conflict zone will be violated by the mobile vehicle.

20. The mobile vehicle of claim 19, wherein:
weights controlling the first population of neurons are configured by a first weight matrix which adjusts based on responses to changes in acceleration or heading;
a first bias vector controls the bias of the first population of neurons, the first bias vector corresponding to a relative position between the mobile vehicle and the other vehicle; and
weights controlling the second population of neurons are configured by a second weight matrix corresponding to constraints on the mobile vehicle's motion based on respecting the other vehicle's trajectory within the conflict zone, and such that the first population of neurons are inhibited based on activation of the second population of neurons.

21. The mobile vehicle of claim 11, wherein the weights are determined by training and updated based on outcomes for the mobile vehicle moving into the conflict zone.

* * * * *